United States Patent
Cohen et al.

(10) Patent No.: US 9,092,579 B1
(45) Date of Patent: *Jul. 28, 2015

(54) RATING POPULARITY OF CLUSTERS OF RUNS OF TEST SCENARIOS BASED ON NUMBER OF DIFFERENT ORGANIZATIONS

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,925

(22) Filed: Dec. 27, 2013

Related U.S. Application Data

(63) Continuation-in-part of application No. 13/103,078, filed on May 8, 2011, now Pat. No. 8,739,128.

(60) Provisional application No. 61/747,313, filed on Dec. 30, 2012, provisional application No. 61/814,305, filed on Apr. 21, 2013, provisional application No. 61/919,773, filed on Dec. 22, 2013.

(51) Int. Cl.
*G06F 9/44* (2006.01)
*G06F 11/36* (2006.01)

(52) U.S. Cl.
CPC .................................. *G06F 11/3688* (2013.01)

(58) Field of Classification Search
None
See application file for complete search history.

(56) References Cited

U.S. PATENT DOCUMENTS

| | | | |
|---|---|---|---|
| 5,544,310 A * | 8/1996 | Forman et al. ................... 714/31 |
| 5,629,878 A | 5/1997 | Kobrosly | |
| 5,781,720 A * | 7/1998 | Parker et al. ................ 714/38.11 |
| 5,905,856 A * | 5/1999 | Ottensooser .................. 714/38.1 |
| 6,360,332 B1 * | 3/2002 | Weinberg et al. .............. 714/4.1 |
| 6,546,523 B1 * | 4/2003 | Boorananut et al. ............ 716/56 |
| 6,810,494 B2 | 10/2004 | Weinberg et al. | |
| 6,865,692 B2 | 3/2005 | Friedman et al. | |
| 6,898,784 B1 | 5/2005 | Kossatchev et al. | |
| 7,032,212 B2 * | 4/2006 | Amir et al. ..................... 717/124 |
| 7,191,435 B2 * | 3/2007 | Lau et al. ....................... 717/168 |
| 7,475,289 B2 * | 1/2009 | Rosaria et al. ................ 714/38.1 |
| 7,490,319 B2 * | 2/2009 | Blackwell et al. ............. 717/124 |
| 7,506,211 B2 * | 3/2009 | Apostoloiu et al. ........ 714/38.14 |

(Continued)

OTHER PUBLICATIONS

Sreedevi Sampath, A Scalable Approach to User-session based Testing of Web Applications through Concept Analysis, 2004.

(Continued)

*Primary Examiner* — Isaac T Tecklu

(57) ABSTRACT

System, method, and non-transitory medium for rating popularity of clusters of runs of test scenarios. An interface receives runs of test scenarios, run by users belonging to different organizations, run essentially on same packages of software systems. A clustering module clusters the runs into clusters that include similar runs of test scenarios. An organization counter counts the number of different organizations associated with a cluster; an organization may be considered associated with a certain cluster if the certain cluster includes a run of a test scenario run by a user belonging to the organization. A cluster rating module computes popularity ratings of at least some of the clusters based on the number of different organizations associated with the clusters; the higher the number of different organization associated with a cluster, the higher the popularity rating of the cluster.

20 Claims, 10 Drawing Sheets

(56) References Cited

U.S. PATENT DOCUMENTS

| | | | |
|---|---|---|---|
| 7,512,839 B2* | 3/2009 | Coulter et al. | 714/30 |
| 7,516,440 B2* | 4/2009 | Upton | 717/106 |
| 7,526,680 B2* | 4/2009 | Mathew et al. | 714/37 |
| 7,581,212 B2 | 8/2009 | West et al. | |
| 7,596,731 B1* | 9/2009 | Sharma | 714/724 |
| 7,809,525 B2 | 10/2010 | Chagoly et al. | |
| 7,849,447 B1 | 12/2010 | Karis et al. | |
| 8,001,527 B1* | 8/2011 | Qureshi et al. | 717/120 |
| 8,205,191 B1* | 6/2012 | Kolawa et al. | 717/124 |
| 8,266,592 B2* | 9/2012 | Beto et al. | 717/124 |
| 8,276,123 B1* | 9/2012 | Deng et al. | 717/125 |
| 8,411,579 B2* | 4/2013 | Ngo et al. | 370/248 |
| 8,561,036 B1* | 10/2013 | Beans et al. | 717/140 |
| 2002/0138226 A1* | 9/2002 | Doane | 702/119 |
| 2003/0126586 A1* | 7/2003 | Sluiman et al. | 717/124 |
| 2003/0131290 A1* | 7/2003 | Weinberg et al. | 714/46 |
| 2004/0107415 A1* | 6/2004 | Melamed et al. | 717/124 |
| 2004/0123272 A1* | 6/2004 | Bailey et al. | 717/125 |
| 2005/0071818 A1* | 3/2005 | Reissman et al. | 717/127 |
| 2005/0144593 A1* | 6/2005 | Raghuvir et al. | 717/124 |
| 2005/0166094 A1* | 7/2005 | Blackwell et al. | 714/38 |
| 2006/0129994 A1* | 6/2006 | Srivastava et al. | 717/124 |
| 2006/0168565 A1* | 7/2006 | Gamma et al. | 717/122 |
| 2006/0200803 A1* | 9/2006 | Neumann et al. | 717/120 |
| 2007/0038908 A1* | 2/2007 | Hirano et al. | 714/724 |
| 2007/0043980 A1* | 2/2007 | Ohashi et al. | 714/45 |
| 2007/0055911 A1* | 3/2007 | Boehm et al. | 714/31 |
| 2007/0220341 A1* | 9/2007 | Apostoloiu et al. | 714/33 |
| 2007/0226543 A1* | 9/2007 | Young et al. | 714/43 |
| 2008/0010537 A1* | 1/2008 | Hayutin et al. | 714/38 |
| 2008/0065687 A1* | 3/2008 | Coulter et al. | 707/102 |
| 2008/0086348 A1 | 4/2008 | Rao et al. | |
| 2008/0086499 A1* | 4/2008 | Wefers et al. | 707/102 |
| 2008/0098361 A1* | 4/2008 | Kumar et al. | 717/128 |
| 2008/0127095 A1* | 5/2008 | Brennan et al. | 717/124 |
| 2008/0141221 A1* | 6/2008 | Benesovska et al. | 717/124 |
| 2008/0172652 A1* | 7/2008 | Davia et al. | 717/124 |
| 2008/0184206 A1* | 7/2008 | Vikutan | 717/127 |
| 2008/0228805 A1* | 9/2008 | Bruck et al. | 707/102 |
| 2008/0263505 A1* | 10/2008 | StClair et al. | 717/101 |
| 2009/0106262 A1 | 4/2009 | Fallen et al. | |
| 2009/0138855 A1* | 5/2009 | Huene et al. | 717/125 |
| 2009/0144010 A1* | 6/2009 | Witter et al. | 702/115 |
| 2009/0144698 A1* | 6/2009 | Fanning et al. | 717/120 |
| 2009/0183143 A1 | 7/2009 | Li et al. | |
| 2009/0187894 A1* | 7/2009 | Bell et al. | 717/127 |
| 2009/0199160 A1* | 8/2009 | Vaitheeswaran et al. | 717/124 |
| 2009/0204591 A1* | 8/2009 | Kaksonen | 707/3 |
| 2009/0259992 A1* | 10/2009 | Cormier et al. | 717/126 |
| 2009/0265681 A1* | 10/2009 | Beto et al. | 717/100 |
| 2009/0307650 A1* | 12/2009 | Saraf et al. | 717/101 |
| 2009/0313606 A1* | 12/2009 | Geppert et al. | 717/124 |
| 2010/0064282 A1* | 3/2010 | Triou et al. | 717/125 |
| 2010/0146490 A1* | 6/2010 | Grosse et al. | 717/131 |
| 2010/0192220 A1 | 7/2010 | Heizmann et al. | |
| 2010/0287534 A1* | 11/2010 | Vangala et al. | 717/124 |
| 2010/0332535 A1* | 12/2010 | Weizman et al. | 707/770 |
| 2011/0145788 A1* | 6/2011 | Xu et al. | 717/121 |
| 2012/0197626 A1* | 8/2012 | Kejariwal et al. | 703/22 |
| 2012/0216176 A1* | 8/2012 | Gaikwad et al. | 717/124 |
| 2013/0014084 A1* | 1/2013 | Sahibzada et al. | 717/124 |
| 2013/0275949 A1* | 10/2013 | Kawashima et al. | 717/124 |
| 2014/0025994 A1* | 1/2014 | Kube et al. | 714/33 |
| 2014/0040867 A1* | 2/2014 | Wefers et al. | 717/131 |
| 2014/0115565 A1* | 4/2014 | Abraham et al. | 717/128 |
| 2014/0237450 A1* | 8/2014 | Levy et al. | 717/124 |
| 2014/0304688 A1* | 10/2014 | Bhat et al. | 717/130 |
| 2014/0325485 A1* | 10/2014 | Sawano | 717/124 |

OTHER PUBLICATIONS

Jinhua Li, Clustering User Session Data for Web Applications Test, 2011, Journal of Computational Information Systems.

G. Ruffo, R. Schifanella, and M. Sereno, Walty: A User Behavior Tailored Tool for Evaluating Web Application Performance, 2004, Proceedings of the Third IEEE International Symposium on Network Computing and Applications.

Sanaa Alsmadi, Generation of Test Cases From Websites User Sessions, 2011, The 5th International Conference on Information Technology.

* cited by examiner

RATING POPULARITY OF CLUSTERS OF RUNS OF TEST SCENARIOS BASED ON NUMBER OF DIFFERENT ORGANIZATIONS

CROSS-REFERENCE TO RELATED APPLICATIONS

This Application is a Continuation-In-Part of application Ser. No. 13/103,078, filed May 8, 2011. This Application claims the benefit of U.S. Provisional Patent Application No. 61/747,313, filed Dec. 30, 2012, and U.S. Provisional Patent Application No. 61/814,305, filed Apr. 21, 2013. This application also claims the benefit of U.S. Provisional Patent Application No. 61/919,773, filed Dec. 22, 2013, the entire contents of which is herein incorporated by reference in its entirety for all that it teaches without exclusion of any part thereof.

The following co-pending US Patent Applications, filed on Dec. 27, 2013: Ser. Nos. 14/141,514; 14/141,564; 14/141,588; 14/141,623; 14/141,655; 14/141,676; 14/141,726; 14/141,859; 14/141,887; 14/141,974, and the following co-pending US Patent Applications, filed on Dec. 28, 2013: Ser. Nos. 14/142,768; 14/142,769; 14/142,770; 14/142,771; 14/142,772; 14/142,774; 14/142,781; 14/142,783; 14/142,784, may include related subject matter.

BACKGROUND

Running tests to verify the performance of software systems is important for maintaining the integrity of the software systems. Often events such as installation of new software modules, updating, and/or customizing software modules, require running many tests in order to verify that after the software systems still operate as expected. Since such software systems are often large and complex, e.g., SAP ERP or Oracle EBS may include many software modules, testing can take up a large portion of the information technology (IT) budgets of the organizations.

Since many organizations utilize same or similar software modules (e.g., modules belonging to standard software packages), they often end up running similar tests. Collecting testing data from multiple organizations may enable those and/or other organizations, to utilize each other's testing-related knowledge, which is in a sense a wisdom of the crowd (of testers). Consequently, they might be able to come up with a more effective and efficient testing plan. That being said, given the diversity in software systems and customizations, and the large and diverse body of tests performed to validate the software systems, it may not be an easy task to select tests that are likely to be beneficial. While some tests that are run may be effective and test relevant aspects of systems, others may be ineffective, erroneous, and/or test esoteric organization-specific aspects of software systems. Thus, though there may be many thousands of transactions that can be tested by a certain organization, it may be difficult to select which transaction to test, and/or which tests are most relevant. Given a desire to select and/or generate a test for a new organization, which of the many tests in the collection of testing data should be considered? An improper selection of the tests may lead to suboptimal results, such as providing the new organization with an irrelevant or ineffective test.

BRIEF SUMMARY

Some aspects of this disclosure involve methods, systems, and/or non-transitory computer-readable medium, which enable rating of clusters of runs of test scenarios. In some embodiments, the rating is done according to the number of different organizations associated with a cluster. Optionally, an organization may be considered associated with a certain cluster if the certain cluster includes a run of a test scenario run by a user belonging to the organization. Optionally, the rating is a popularity rating, in which the higher the number of different organization associated with a cluster, the higher the popularity rating of the cluster.

In some embodiments, a high popularity rating may indicate that the cluster contains runs of test scenarios that were found useful by users from many organizations. Thus, the runs in the cluster are likely to be useful for other organizations that need to run tests. Similarly, the fact that a cluster has a low rating may indicate that it is less likely to contain useful data for a different organization.

One aspect of this disclosure involves a computer system that is configured to rate popularity of clusters of runs of test scenarios. The computer system includes an interface that is configured to receive runs of test scenarios run by users belonging to different organizations essentially on same packages of software systems. Additionally, the computer system includes a clustering module that is configured to cluster the runs into clusters that include similar runs of test scenarios. The computer system also includes an organization counter that is configured to count a number of different organizations associated with a cluster. Optionally, an organization may be considered associated with a certain cluster if the certain cluster includes a run of a test scenario run by a user belonging to the organization. The computer system also includes a cluster rating module that is configured to compute popularity ratings of at least some of the clusters based on the number of different organizations associated with the clusters; the higher the number of different organizations associated with a cluster, the higher the popularity rating of the cluster.

In one embodiment, the computer system may optionally include a template generator that is configured to generate a test scenario template based on at least one run of a test scenario from a cluster with a high popularity rating. Optionally, the test scenario template identifies a transaction used by the at least one run of a test scenario belonging to the cluster with the high popularity rating, and possible values for running the transaction. Additionally, the computer system may optionally include a user interface that is configured to suggest to a user to run an instantiation of the test scenario template. Additionally, the computer system may optionally include a data cleaner configured to: select a value from the test scenario template, and remove the selected value from the test scenario template if the selected value appears in less than a first predetermined number of runs belonging to the cluster with the high popularity rating, or runs belonging to the cluster with the high popularity rating that include the selected value are associated with less than a second predetermined number of different organizations. In this embodiment, both the first predetermined amount and the second predetermined amount are greater than one.

Another aspect of this disclosure involves a computer implemented method for rating popularity of clusters of runs of test scenarios. Executing the method may involve performing the following: Receiving runs of test scenarios run by users from different organizations essentially on same packages of software systems. Clustering the runs into clusters that include similar runs of test scenarios. Counting the number of different organizations associated with the clusters. Optionally, an organization may be considered to be associated with a cluster if a user belonging to the organization runs a test scenario belonging to the cluster. And computing popularity ratings of at least some of the clusters based on number of different organizations associated with each of the clusters; the higher the number of different organizations associated with a cluster, the higher the popularity rating of the cluster.

In one embodiment, executing the method may optionally involve monitoring the users running the test scenarios on the software systems that belong to the different organizations in order to identify the runs of the test scenarios.

In one embodiment, executing the method may optionally involve generating a test scenario template based on at least one run of a test scenario from a cluster with a high popularity rating. Optionally, the test scenario template identifies a transaction used by the at least one run of a test scenario belonging to the cluster with the high popularity rating, and possible values for running the transaction. Additionally, executing the method may optionally involve selecting a value from the test scenario template and removing the selected value from the test scenario template if the selected value appears in less than a first predetermined number of runs of test scenarios in the cluster with the high popularity rating or the selected value appears in runs of test scenarios in the cluster with the high popularity rating that are associated with less than a second predetermined number of different organizations; both the first predetermined amount and the second predetermined amount are greater than one. Additionally, executing the method may optionally involve selecting a value from a run of a test scenario in the cluster with the high popularity rating, testing whether the value appears in at least a first predetermined number of runs of test scenarios in the cluster with the high popularity rating, testing whether the value appears in runs in the cluster with the high popularity rating that are associated with at least a second predetermined number of different organizations, and if both conditions are positive, enabling the test scenario template to utilize the selected value. Additionally, executing the method may optionally involve suggesting to a user to run an instantiation of the test scenario template. Additionally, executing the method may optionally involve customizing the test scenario template for a user by adding to the test scenario template proprietary data relevant to the user.

Yet another aspect of this disclosure involves a non-transitory computer-readable medium for use in a computer to rate popularity of clusters of runs of test scenarios. The computer includes a processor, and the non-transitory computer-readable medium includes the following program code: Program code for receiving runs of test scenarios run by users from different organizations essentially on same packages of software systems. Program code for clustering the runs into clusters that include similar runs of test scenarios. Program code for counting number of different organizations associated with the clusters. Optionally, an organization may be considered associated with a cluster if a user belonging to the organization runs a test scenario belonging to the cluster. And program code for rating popularity of the clusters based on number of different organizations associated with each of the clusters; the higher the number of different organizations associated with a cluster, the higher the popularity rating of the cluster.

In one embodiment, the non-transitory computer-readable medium also stores program code for monitoring the users running the test scenarios on the software systems that belong to the different organizations in order to identify the runs of the test scenarios. In one embodiment, the non-transitory computer-readable medium also stores program code for generating a test scenario template based on at least one run of a test scenario from a cluster with a high popularity rating; the test scenario template identifies a transaction used by the at least one run of a test scenario belonging to the cluster with the high popularity rating, and possible values for running the transaction.

BRIEF DESCRIPTION OF THE DRAWINGS

The embodiments are herein described, by way of example only, with reference to the accompanying drawings. In the drawings.

DETAILED DESCRIPTION

Figure 1:
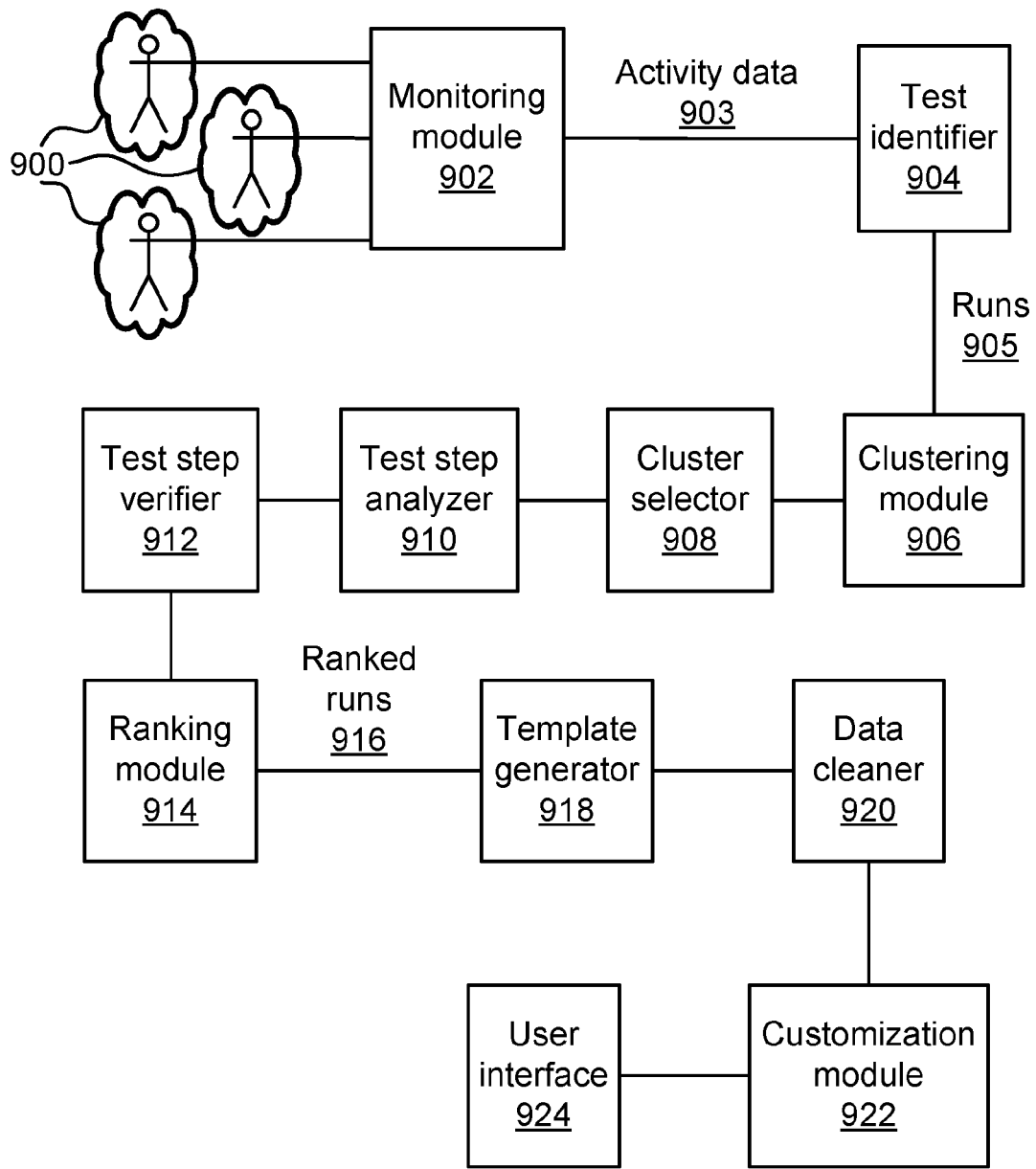
FIG. 1 illustrates one embodiment of a system configured to rank similar runs of test scenarios based on unessential test steps in the runs.

The term "transaction" is defined as a computer program, such as SAP ERP transaction or Oracle Application Form. In one example, a transaction may enable a user to access a certain functionality and/or may be called by filling its code in a box in a screen and/or by selecting it from a menu. In another example, a transaction is a logical portion of work, performed by a processor, involving the execution of one or more SQL statements.

The term "test step" refers to one or more actions performed via a User Interface (UI) as part of running a test scenario. In some cases, performing actions via a user interface may be achieved by interacting with the user interface, and/or by interacting with an Application Program Interface (API) related to the user interface.

The terms "a description of a run of a test scenario", also referred to as "a run of a test scenario", refer to data pertaining to running a test scenario on a software system (e.g., inputs, outputs, and/or intermediate data generated prior to running the test scenario, data generated during its run, and/or data generated as a result of running the test scenario). In one example, a run of test scenario may be obtained from monitoring a user running the test scenario on a software system. In the interest of brevity, in this disclosure, a term like "run of a test scenario" may be replaced with the shorter "run", where it is clear from the context. A run of a test scenario may be referred to as being "run by a user". This means that data included in the run of the test scenario is related to, or generated from, activity of the user on a software system, in which test steps of the test scenario were executed. Optionally, at least some of the data included in the run of the test scenario is derived from monitoring the activity of the user, which is related to execution of the test steps. Additionally, a run of a test scenario may be referred to as being associated with an organization, meaning that the run of the test scenario was run by a user belonging to the organization. Optionally, the user belonging to the organization ran the test scenario, at least in part, on a software system that belongs to the organization. Moreover, if it is mentioned, for example, that runs of test scenarios are received or clustered, it is meant that the objects being received may be processed descriptions of the runs of test scenarios (e.g., describing various attributes of the runs of the test scenarios), and not necessarily the actual raw recorded data that was initially obtained from monitoring users running the test scenarios.

A run of a test scenario may be considered an instantiation of the test scenario. That is, a certain test scenario may be run several times. For example, a test scenario may be run by different users, run on different systems, and/or run by the same user on the same system at different times. Each time the test scenario is run, that may be considered an event of instantiating the test scenario, and each run of the test scenario may be considered an instantiation of the test scenario.

In some embodiments, runs of test scenarios are identified from data obtained from monitoring users. Optionally, monitoring users may involve detecting, recording, and/or analyzing information entered by the users to computer systems and/or information presented to the users by the computer systems. Additionally or alternatively, monitoring may involve logging programs that were executed by the users, values utilized by the programs, memory content of programs and/or network traffic related to activities taken by the users. Optionally, a run of a test scenario may include data obtained from monitoring that underwent processing, summarization and/or analysis. Thus, a run of a test scenario need not necessarily include all data obtained from monitoring the running of the test scenario, and/or include data obtained from the monitoring in the same form as it was originally collected in.

A run of a test scenario may include descriptions of various aspects of running the test scenario such as: (i) the identity and/or composition (e.g., field types and/or identifiers) of a user interface (UI) screens the user manipulated and/or was exposed to while running the test scenario; (ii) user interactions with a system (e.g., actions performed by the user) (iii) transactions executed; (iii) behavior of the system during the test scenario (e.g., content of network transmissions, procedure calls, requests made to components of the system); and/or (iv) representations of the state of the system at various stages before, during, and/or after the test scenario is run. Additionally, a run of a test scenario may include data extracted from the test scenario and/or template of which the run is an instantiation. For example, the run may include values taken from a script according to which the run is executed and/or default values that appeared in template of which the run is an instantiation. The run may even include portions, or the entire scope, of the test scenario and/or the template of which the run is an instantiation.

A test scenario that is run by a user may be characterized according to its degree of automation, depending on type of involvement required of the user. In cases where the user is required to enter most of the values (e.g., field values on a screen), the run of the test scenario may be considered to be a manual run. In other cases, where the system provides some of the values (e.g., automatically fills values in no more than 95% of the fields on a screen/transaction/business process), but the user is still required to provide other values (e.g. enter values to fields that remain without values in the screen/transaction/business process), the run of the test scenario may be considered to be a semiautomatic run. In cases where little to no user intervention is needed (e.g., the script for running a test includes more than 95% of the values to be entered to the UI for the test, and is read by the system), the run of the test scenario may be considered to be an automatic run.

The term "test scenario template" refers to a model according to which a test scenario may be structured. A test scenario template may include one or more test steps, which instruct a user on an action to perform as part of the test, such as where to enter a value, what button to push, what screen to select, or what transaction to run. Optionally, a test scenario template may include one or more default values used for running an instantiation of the test scenario template (e.g., default values for certain fields in a screen). Additionally or alternatively, a test scenario template may be missing one or more values that are required for running an instantiation of the test scenario template; in such a case, a user running the instantiation of a template may provide the one or more missing values. In the interest of brevity, in this disclosure, a term like "test scenario template" may be replaced with the shorter "template", where it is clear from the context.

A run of a test scenario based on a test scenario template may be considered an instantiation of the test scenario template. For example, different users may run test scenarios based on a certain template; each time one of the users runs a test scenario based on the certain template, the corresponding run of that test scenario is considered an instantiation of the certain template. Similarly, if a user runs multiple test scenarios based on a template, where each time a test scenario was run it was run on a same software system, each of the runs of the test scenarios is considered a separate instantiation of the certain template. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization.

As used herein, the term "software system" refers to a computer system that has software components (e.g., software modules that include programs). A software system may involve hardware (e.g., servers with processors) on which the software may run. The hardware may be dedicated hardware for the software system (e.g., servers sitting at an organization to which the software systems belong). Additionally or alternatively, hardware involved in a software system may be allocated on demand (e.g., cloud-based servers that are utilized by the software system as needed by it).

Figure 2:
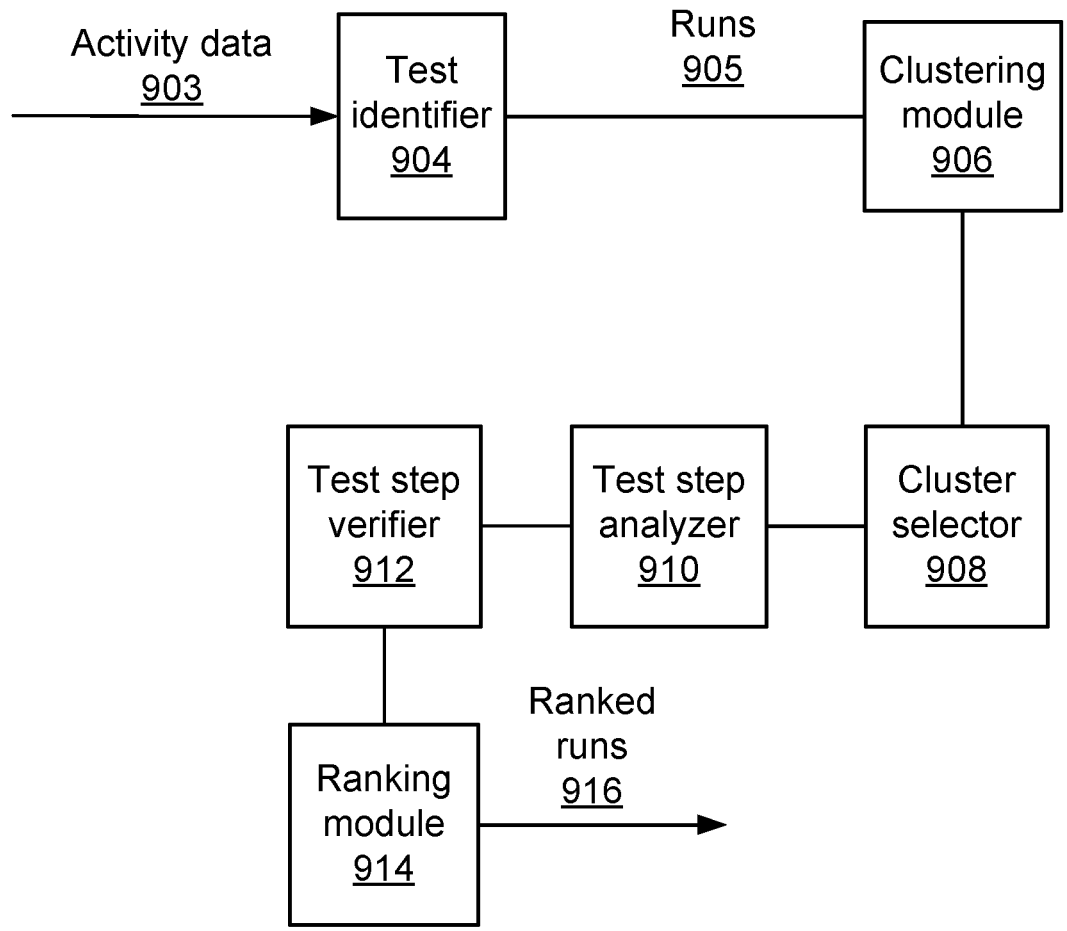
FIG. 2 illustrates one embodiment of a system configured to rank similar runs of test scenarios based on unessential test steps in the runs.

FIG. 1 and FIG. 2 illustrate embodiments of a computer system configured to rank similar runs of test scenarios based on unessential test steps in the runs. The illustrated embodiments include at least a test identifier 904, a clustering module 906, a cluster selector 908, a test step analyzer 910, a test step verifier 912, and a ranking module 914.

The test identifier 904 is configured to identify runs 905 of test scenarios run by users on software systems that belong to different organizations. Optionally, the users belong to different organizations. Optionally, the runs 905 are identified, at least in part, from activity data 903. In one example, the runs 905 include at least a first run that was run by a first user belonging to a first organization and a second run that was run by a second user belonging to a second organization, and the first organization is not the second organization and the first user is not the second user.

In one embodiment, a test scenario may be characterized as including one or more test steps; running the test scenario involves execution of the one or more test steps, and a run of the test scenario may describe the one or more test steps. Optionally, the test identifier 904 determines for at least some of the runs 905, at least some of the test steps that are executed while running the test scenarios. Optionally, test steps may identified by a name, code, description, and/or serial number. Optionally, each run of the at least some runs, is associated with at least one subset of test steps that were executed in the run.

The clustering module 906 is configured to cluster the runs 905 of the test scenarios to clusters of similar runs of test scenarios. Optionally, the clustering module 906 is configured to process one or more of the following logged activities: a list of users who ran the test scenarios, an analysis of access to a database, messages returned from executed transactions, values returned by fields, and procedures utilized by a test scenario. Optionally, the clusters may be of various sizes, and include runs of various users belonging to different organizations. Optionally, the clustering module 906 performs processing of the runs 905 prior to clustering; for example, it extracts field values from screens in runs. Optionally, the clustering module 906 may receive the runs 905 after they undergo processing. For example, the runs may be represented as vectors of features on which a clustering algorithm utilized by the clustering module 906 may operate.

The cluster selector 908 is configured to select from the clusters a certain cluster. The selection of a cluster may be done according to various parameters, such the cluster's size, the number organizations associated with runs belonging to the cluster, and/or attributes of transactions executed in the runs belonging to the cluster. Optionally, the more runs belong to a cluster and/or the larger the number of organizations associated with runs that belong to the cluster, the likelier the cluster selector 908 is to select the cluster to be the certain cluster.

In one embodiment, the certain cluster selected by the cluster selector 908 includes a first run of a first test scenario and a second run of a second test scenario; the first run is associated with a first organization belonging to the different organizations and the second run is associated with a second organization belonging to the different organizations. Additionally, the first run is not identical to the second run, and the first organization is not the second organization. In this embodiment, the fact that the selected cluster includes runs associated from different organizations may be indicative of the fact that the runs test business processes and/or transactions that are likely also used by organizations other than the first and second organizations.

In another embodiment, the cluster selector 908 receives a profile of a certain user and/or a certain organization, and selects the certain cluster based on the profile. Optionally, the profile may indicate usage data of the certain user and/or the certain organization. For example, the profile may indicate certain business processes, transactions, screens, and/or values that appear runs of test scenarios run by the certain user and/or associated with the certain organization. The cluster selector 908 may then select the certain cluster such that the cluster includes runs related to the certain business processes, transactions, screens, and/or values.

The test step analyzer 910 is configured to identify occurrences of potentially unessential test steps in the similar runs of test scenarios. The test step analyzer 910 may base its analysis on data included in the similar runs of test scenarios, such as data related to execution of transactions including input/output values of business processes, screens, and/or transactions. The test step analyzer 910 may also utilize additional resources such as looking up test steps (e.g., according to an identifier, command code) in a database to determine whether they are potentially unessential.

Note, that in this embodiment, a test step may be considered to be a potentially unessential test step if analysis of a run of a test scenario indicates that it is likely to be unessential; additional evidence may be required in order for the test step to be considered a verified unessential test step.

In one embodiment, a potentially unessential test step may be characterized by the fact that when a potentially unessential test step is removed from a certain test scenario, that does not affect main outcome of running the certain test scenario. For example, if a specific test step in a test scenario requires input of certain data that is just stored and not utilized throughout the test, then skipping the specific test step when running the test scenario is not likely to change anything in the outcome. This fact may indicate that the specific test step is potentially unessential.

In another embodiment, the test step analyzer 910 is configured to identify a screen, which does not return a value usable for its calling screen, as an unessential screen that generates a potentially unessential test step. For example, a certain test step may involve entering values into a certain screen. Filling values into the certain screen does not result in the execution of a business process that affects the system (e.g., a read and/or write to a database), but rather just in the return of a generic code. The generic code is not utilized by the screen that came before (called) the certain screen, and is essentially discarded. In this example, the certain screen does not contribute much to the testing of the system and is thus a potentially unessential screen. The certain test step that involves filling in data to the certain screen can thus be considered a potentially unessential test step, since it does not do something useful for testing the system.

In yet another embodiment, the test step analyzer 910 is further configured to identify a test step that generates an error message as a potentially unessential test step. For example, a screen that returns an error message such as invalid zip code entered may correspond to an unessential step (entering the zip code in the screen may be the test step). In this example, the error code may have emerged when attempting to switch between screens, in which case, the entered data is verified by the system. After receiving the error message, it may be assumed that a following corrective step is the right one (e.g., filling in a new and correctly formatted zip code), and thus the previous step (that is corrected by the corrective step) is potentially unessential.

In some embodiments, relying on analysis of test steps to determine whether they are unessential may not be sufficient. There may be considerations that were not taken in to account in the analysis, and thus even though a test step looks like it is unessential (based on the analysis), it is in fact not unessential. Therefore, test steps designated the test step analyzer 910 are labeled only "potentially unessential test steps". The fact that a certain potentially unessential test step is widely performed may serve as evidence that its label as "potentially unessential" may be a mistake, and in fact that analysis of the certain test step may be wrong. Optionally, evidence of a test step being widely performed may involve observing occurrences of the certain test step in numerous runs of test scenarios, by multiple users, and/or by user belonging to different organizations.

Herein, an occurrence of a certain test step in a run of a test scenario refers to there being in the run of the test scenario evidence that the certain test step was performed when the test scenario was executed (as recorded in the run). Optionally, the evidence may be direct (e.g., by specifically mentioning execution of commands from the test step) and/or indirect (e.g., by including in the run a value returned by the certain test step).

In one embodiment, the test step verifier 912 determines how widespread is the use of a certain test step based on runs of test scenarios of users from different organizations. The test step verifier 912 is configured to count, for each potentially unessential test step, number of different users that ran a test scenario that includes the potentially unessential test step. The test step verifier 912 is also configured to label a potentially unessential test step as a verified unessential test step when its corresponding number of different users is below a predetermined threshold. Optionally, the predetermined threshold is proportional to number of users that ran test scenarios with runs in the certain cluster; for example, the predetermined threshold equals 5% of the number of users belonging to the different organizations that ran runs that belong to the certain cluster. Thus, the larger the number of users that ran test scenarios with runs in the certain cluster, the higher the predetermined threshold. In another example, the predetermined threshold is fixed and set to 5 users.

In one embodiment, the test step verifier 912 determines how widespread is the use of a certain test step based on runs of test scenarios associated with different organizations. Optionally, the test step verifier 912 is configured to count, for each potentially unessential test step, the number of different organizations that have a user that belongs to them that ran a test scenario that includes the potentially unessential test step. The test step verifier 912 is also configured to label a potentially unessential test step as a verified unessential test step when its corresponding number of different organizations is below a predetermined threshold. Optionally, the predetermined threshold is proportional to number of the different organizations; for example, the predetermined threshold corresponds to 10% of the number of different organizations. Thus, the larger the number of different organizations, the higher the predetermined threshold. In another example, the predetermined threshold is fixed. For example, the predetermined threshold is two organizations.

In yet another embodiment, the test step verifier 912 determines how widespread is the use of a certain test step based on runs of test scenarios of users from different organizations. The test step verifier 912 is configured to count, for each potentially unessential test step, a first number of different users that ran a test scenario that includes the potentially unessential test step, and a second number of different organizations that have a user that belongs to them that ran a test scenario that includes the potentially unessential test step. The test step verifier 912 is also configured to label a potentially unessential test step as a verified unessential test step when its corresponding first number of different users is above a first predetermined threshold and its corresponding second number of different organizations is above a second predetermined threshold.

Optionally, the first predetermined threshold is proportional to number of users that ran test scenarios with runs that belong the certain cluster; for example, the first predetermined threshold may be set at 10% of the users that have runs in the certain cluster. Alternatively, the first predetermined threshold may be fixed; for example, the first predetermined threshold may be set to be 7. Optionally, the second predetermined threshold is proportional to number of the different organizations; for example, the second predetermined is set to 5% of the number of different organizations. Alternatively, the second predetermined threshold is fixed; for example, the second predetermined threshold is set to be 3.

The ranking module 914 is configured to rank the runs of the test scenarios belonging to the certain cluster based on number of occurrences of verified unessential test steps in the runs, such that a first run, having more occurrences of verified unessential test steps than a second run, is ranked lower than the second run.

As used in here, the verb rank and its derivatives may mean to either induce and order according to some score or to assign a score from which an ordering may be induced. For example, ranking the runs of test scenarios belonging to the certain cluster based on the number of occurrences of verified unessential steps can mean that each run is assigned a score that is a function of the number of verified unessential steps (e.g., the score may be given according to the identity function). This score can then be used to order the runs, so a first run with a lower score than a second run comes before the second run (and is thus ranked lower). Alternatively, ranking the runs of test scenarios belonging to the certain cluster based on the number of occurrences of verified unessential steps can mean that the runs are arranged in an increasing order of their number of verified unessential steps (without specifically assigning each an explicit function-generated score).

In one embodiment, the ranking module 914 generates ranked runs 916 of test scenarios. For example, each of the ranked runs 916 may have an associated rank score attached to it; such that the higher the rank score, the higher the run is ranked. Alternatively or additionally, the ranked runs 916 may have an order assigned to them, based on the ranking. For example, a first run that is ranked higher than a second run may appear ahead of the second run according to the order. Optionally, the ranked runs 916 may include ranking information that may be used to associate runs with their corresponding ranks (e.g., the ranking information may include a table that lists run identifiers and their corresponding ranks). Optionally, the ranked runs 916 may include runs of the test scenarios belonging to the certain cluster augmented by the ranking information. In one example, augmenting runs involves adding a score (e.g., a rank score) to the runs. In another example, augmenting runs involves assigning an order to the runs, such that, based on the order, at least one run appears ahead of another run.

In one embodiment, the ranking module 914 ranks runs belonging to the certain cluster, at least in part, according to a number of users and/or organizations that are associated with test scenarios and/or templates of which the runs are instantiations. A user may be considered associated with a test scenario and/or a template if the user ran an instantiation of the test scenario and/or the template. Additionally, an organization may be considered associated with a test scenario and/or a template if a user belonging to the organization is associated with the test scenario and/or the template. Optionally, the larger the number of users and/or organizations associated with a test scenario and/or a template of which a run of a test scenario is an instantiation, the higher the run is ranked by the ranking module.

In one embodiment, the computer system may optionally include a monitoring module 902 that is configured to monitor the users 900 belonging to the different organizations and to provide the activity data 903 obtained from monitoring the users 900 to the test identifier 904.

In one embodiment, the computer system may optionally include a template generator 918 that is configured to generate the test scenario template based on one or more of the ranked runs 916 of test scenarios belonging to the certain cluster and the ranking of the runs. For example, the template generator 918 may select a run of a test scenario belonging to the certain cluster that is a highest ranked run, and generate the template based on the selected run.

In one embodiment, the template generator 918 is configured to generate the test scenario template based on a first and a second run belonging to the ranked runs 916. Optionally, the first run is associated with a first organization and the second run is associated with a second organization that is not the first organization. Optionally, the template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the computer system may optionally include a user interface 924 configured to suggest to a user to run an instantiation of the test scenario template. Optionally, the user interface 924 may initiate the instantiation of the manipulated test scenario template. For example, the user interface 924 may present a first screen belonging to the test scenario template and prompt a user to take a certain action to advance execution.

In one embodiment, the computer system optionally includes a customization module 922. The customization module 922 is configured to customize the test scenario template for a user by adding to the test scenario template proprietary data relevant to the user. Optionally, the customization module 922 receives a profile of the user and customizes the template based on the profile.

In one embodiment, the computer system optionally includes a data cleaner 920 that is configured to remove from the test scenario template proprietary data associated with at least one of the different organizations. Optionally, the data cleaner is configured to remove proprietary data from the one or more ranked runs based upon which the template was generated. Optionally, most output fields of the one or more runs are removed by the data cleaner 920, and as a result, the test scenario template does not include expected values for most test steps.

It is to be noted that different embodiments may implement components of the computer system illustrated in FIG. 1 and/or FIG. 2 in different ways. For example, in some embodiments one or more of the following may be implemented by the same software module and/or software modules running on the same processor: the monitoring module 902, the test identifier 904, the clustering module 906, the cluster selector 908, the test step analyzer 910, the test step verifier 912, the ranking module 914, the template generator 918, the data cleaner 920, the customization module 922, and the user interface 924. Additionally, one or more of the aforementioned components may be implemented on a remote server, such as a cloud-based server.

In one example, the customization module 922 and/or the data cleaner 920 are both implemented as part of the template generator 918. In another example, the clustering module 906 and the cluster selector 908 are both implemented by the same software module. In yet another example, the test step analyzer 910 and the test step verifier 912 are both implemented by the same software module.

In one embodiment, the test scenario template may undergo customization by the customization module 922 prior to removal of proprietary data from the template by the data cleaner 920. In another embodiment, the order is reversed: proprietary data is removed from the template by the data cleaner 920, and then the template is customized by the customization module 922. In still another embodiment, customizing the template and removing proprietary data from it are performed by the same software module.

In another embodiment, the clustering module 906, cluster selector 908, test step analyzer 910, test step verifier 912, and/or the ranking module 914 are implemented as a cloud-based service that receives runs of test scenarios 905 identified from the activity data 903 of the users 900 belonging to the different organizations, and ranks at least some of the runs 905. Optionally, the template generator 918, the test identified 904, and/or the data cleaner 920 may also may also be part of the cloud-based service.

Figure 3:
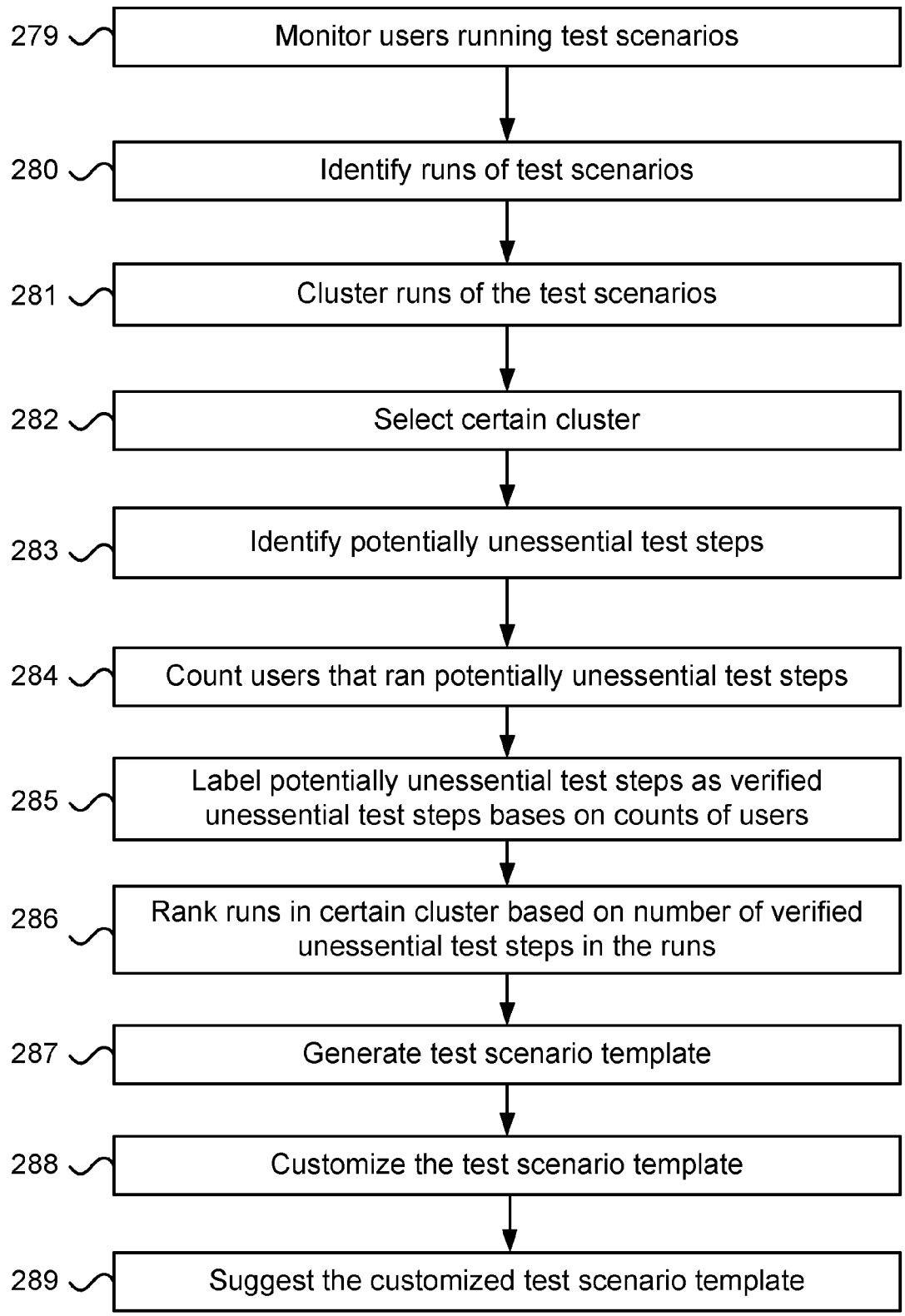
FIG. 3 illustrates one embodiment of a computer implemented method for ranking similar runs of test scenarios based on unessential test steps in the runs.

FIG. 3 illustrates one embodiment of a computer implemented method for ranking similar runs of test scenarios based on unessential test steps in the runs. The illustrated embodiment includes the following steps:

In step 280, identifying runs of test scenarios run by users on software systems that belong to different organizations. A test scenario includes one or more test steps.

In step 281, clustering the runs of the test scenarios to clusters that include similar runs of test scenarios.

In step 282, selecting from the clusters a certain cluster that includes similar runs of test scenarios associated with at least two different organizations.

In step 283, identifying occurrences of potentially unessential test steps in the similar runs of test scenarios. Optionally, identifying an occurrence of an unessential test step in a run of a test scenario is done by analyzing the run in order to determine whether to characterize a test step executed in the run of the test scenario as being a potentially unessential test step. Optionally, there may different ways to characterize a potentially unessential test step. In one example, when a potentially unessential test step is removed from a certain test scenario, that does not affect main outcome of running the certain test scenario. In another example, a screen, which does not return a value usable for its calling screen, may be an unessential screen that generates a potentially unessential test step. In yet another example, a test step that generates an error message may be characterized as a potentially unessential test step. In one embodiment, evidence of one or more of the aforementioned characterizations of a potentially unessential are obtained by analyzing runs of test scenarios belonging to the certain cluster.

In step 284, counting, for each potentially unessential test step, number of different users that ran a test scenario that comprises the potentially unessential test step.

In step 285, labeling some of the potentially unessential test steps as verified unessential test steps. Optionally, a potentially unessential test step is labeled a verified unessential test step when its corresponding number of different users is below a predetermined threshold. Optionally, the predetermined threshold is proportional to the number of various users.

And in step 286, ranking the runs of the test scenarios belonging to the certain cluster based on number of occurrences of verified unessential test steps in the runs, such that a first run, having more verified occurrences of unessential test steps than a second run, is ranked lower than the second run.

In one embodiment, the counting of the number of users in step 284 may be done in order to provide additional evidence that the pattern of usage by users from different organizations supports the fact that indeed certain test steps are unessential. If few users actually utilize a certain potentially unessential test step (e.g., the number of user is below the predetermined threshold), then this may be evidence that the certain potentially unessential test step is indeed unessential; thus it is labeled a "verified unessential test step". However, had there been a large number of users (above the predetermined threshold), then this may be evidence that the test step serves a purpose, and despite being identified as potentially unessential in step 283, it is in fact not unessential.

In another embodiment, a potentially unessential test step may be verified by determining a number of organizations with associated runs that have occurrences of the potentially unessential test step. If the number of organizations is below a predetermined threshold, this may verify that indeed the test step is unessential (the low usage may be evidence of that). Optionally, the predetermined threshold may be proportional to the number of organizations associated with runs in the certain cluster (e.g., the higher the number organizations with runs in the cluster, the higher the predetermined threshold).

In yet another embodiment, a potentially unessential test step may be verified by determining both a first number of users that ran test scenarios with the unessential test step and a second number of organizations that are associated with runs that include occurrences of the potentially unessential test step. If both the first number exceeds a first predetermined threshold, and the second number exceeds a second predetermined threshold, the potentially unessential test step may be not be considered a verified unessential test step. In this example, if one of the first predetermined threshold and second predetermined thresholds are not exceeded, the potentially unessential test step in considered to be a verified unessential test step.

In one embodiment, the computer implemented method may include optional step 287 which involves generating a test scenario template representing the certain cluster based on one or more runs of test scenarios belonging to the certain cluster and ranking of at least some of the runs of test scenarios belonging to the certain cluster. Optionally, at least one of the highest ranked runs of the test scenarios belonging to the certain cluster is utilized for generating a test scenario template for the runs of the test scenarios belonging to the certain cluster. Optionally, generating the test scenario template representing the certain cluster is based on a highest ranked run of a test scenario belonging to the certain cluster.

In one embodiment, the computer implemented method illustrated in FIG. 3 may include an optional step of recording a user while running a certain test scenario, identifying that the certain test scenario is similar to the test scenario template, and suggesting the user to run the generated test scenario template.

In another embodiment, the computer implemented method illustrated in FIG. 3 may include an optional step of selecting a value from the test scenario template, and removing the selected value from the test scenario template if the selected value appears in less than a first predetermined number of the runs of test scenarios in the certain cluster or the selected value appears in runs of test scenarios in the selected cluster that are associated with less than a second predetermined number of different organizations. In this embodiment, both the first predetermined number and the second predetermined number are greater than one.

In yet another embodiment, the computer implemented method illustrated in FIG. 3 may include an optional step of involving selecting a value from a run of a test scenario belonging to the certain cluster, testing whether the value appears in at least a first predetermined number of the runs in the certain cluster. Following that, testing whether the value appears in runs in the certain cluster that are associated with at least a second predetermined number of different organizations. If both conditions are positive, enabling the test scenario template to utilize the selected value. Optionally, if at least one of the aforementioned conditions is negative, the computer implemented method illustrated in FIG. 3 may include an optional step involving not enabling the test scenario template to utilize the selected value.

In one embodiment, the computer implemented method includes optional step 288 which involves customizing the test scenario template for a user by adding to the test scenario template proprietary data relevant to the user.

In one embodiment, the computer implemented method may include optional step 289 which involves suggesting to a user to run an instantiation of the customized test scenario template. Optionally, the user interface 278 is utilized to suggest to the user to run the instantiation of the template. Optionally, the template is customized prior to suggesting to the user.

In one embodiment, the computer implemented method may include optional step 279, which involves monitoring the users and providing data obtained from the monitoring for use in the identifying of the runs of test scenarios.

In one embodiment, the computer implemented method illustrated in FIG. 3 optionally includes a step of removing from the test scenario template proprietary data associated with at least one of the different organizations. Additionally or alternatively, the computer implemented method illustrated in FIG. 3 may optionally include a step of removing proprietary data associated with at least one of the different organizations from one or more runs belonging to the certain cluster.

In one embodiment, a non-transitory computer-readable medium stores program code that may be used by a computer to rank similar runs of test scenarios based on unessential test steps in the runs. The computer includes a processor, and the non-transitory computer-readable medium stores the following program code:

Program code for identifying runs of test scenarios run by users on software systems that belong to different organizations. Optionally, a test scenario comprises one or more test steps.

Program code for clustering the runs of the test scenarios to clusters that include similar runs of test scenarios.

Program code for selecting from the clusters a certain cluster that includes similar runs of test scenarios associated with at least two different organizations.

Program code for identifying occurrences of potentially unessential test steps in the similar runs of test scenarios. Optionally, a potentially unessential test step may be characterize by the fact that removing the potentially unessential test step from a certain test scenario does not affect a main outcome of running the certain test scenario.

Program code for counting, for each potentially unessential test step, number of different users that ran a test scenario that includes the potentially unessential test step.

Program code for labeling some of the potentially unessential test steps as verified unessential test steps. Optionally, a potentially unessential test step may be labeled as a verified unessential test step when its corresponding number of different users is below a predetermined threshold.

And program code for ranking the runs of the test scenarios belonging to the certain cluster based on number of occurrences of verified unessential test steps in the runs, such that a first run, having more verified occurrences of unessential test steps than a second run, is ranked lower than the second run.

In one embodiment, the non-transitory computer-readable medium optionally stores program code for monitoring users belonging to different organizations to identify runs of test scenarios run on software systems belonging to the different organizations.

In one embodiment, the non-transitory computer-readable medium optionally stores program code for identifying a screen, which does not return a value usable for its calling screen, as an unessential screen that generates unessential test steps.

In one embodiment, the non-transitory computer-readable medium optionally stores program code for utilizing at least one of the highest ranked recorded test scenarios for generating a test scenario template representing the certain cluster.

Figure 4:
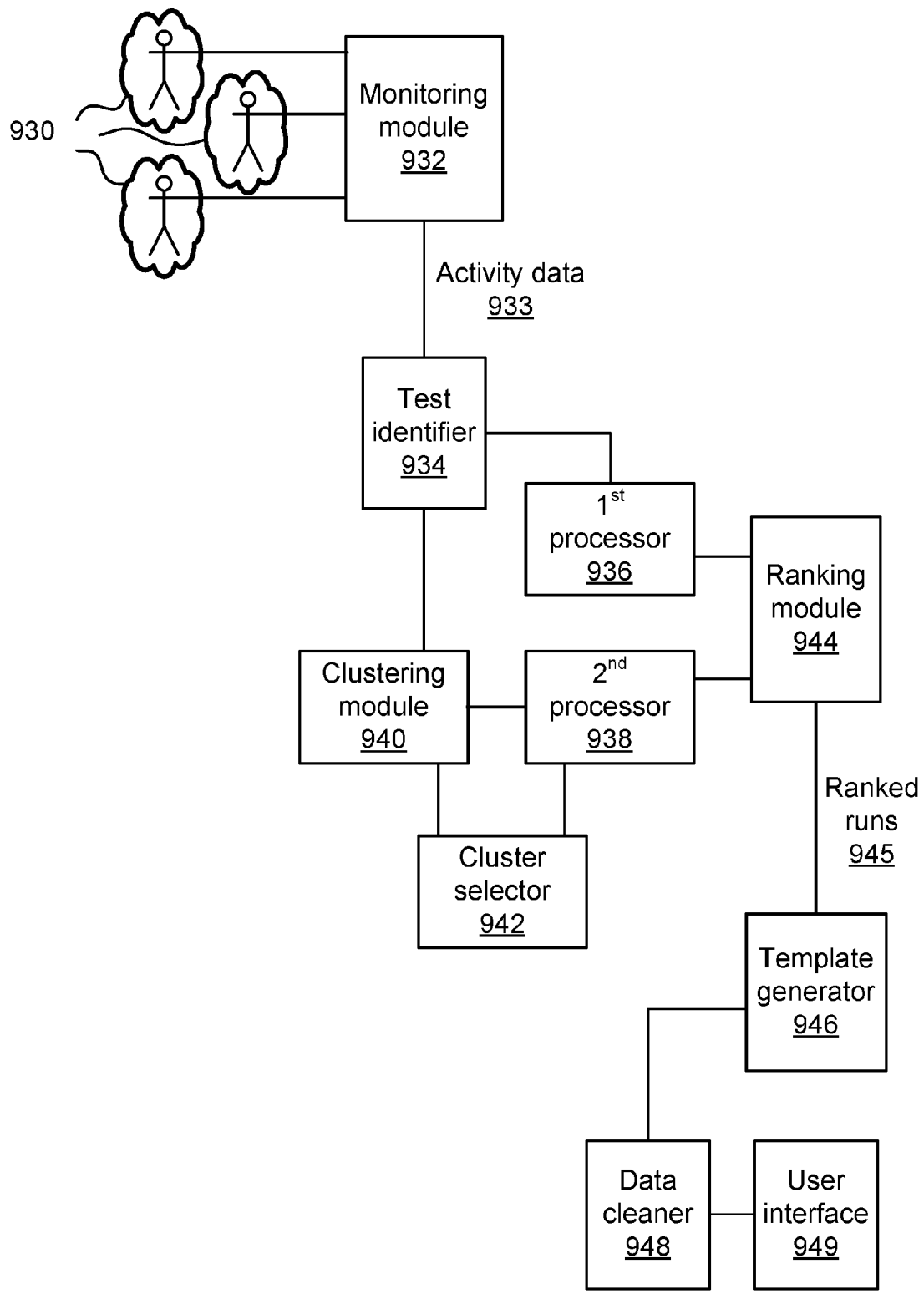
FIG. 4 illustrates one embodiment of a computer system configured to rank runs of test scenarios belonging to a cluster.
Figure 5:
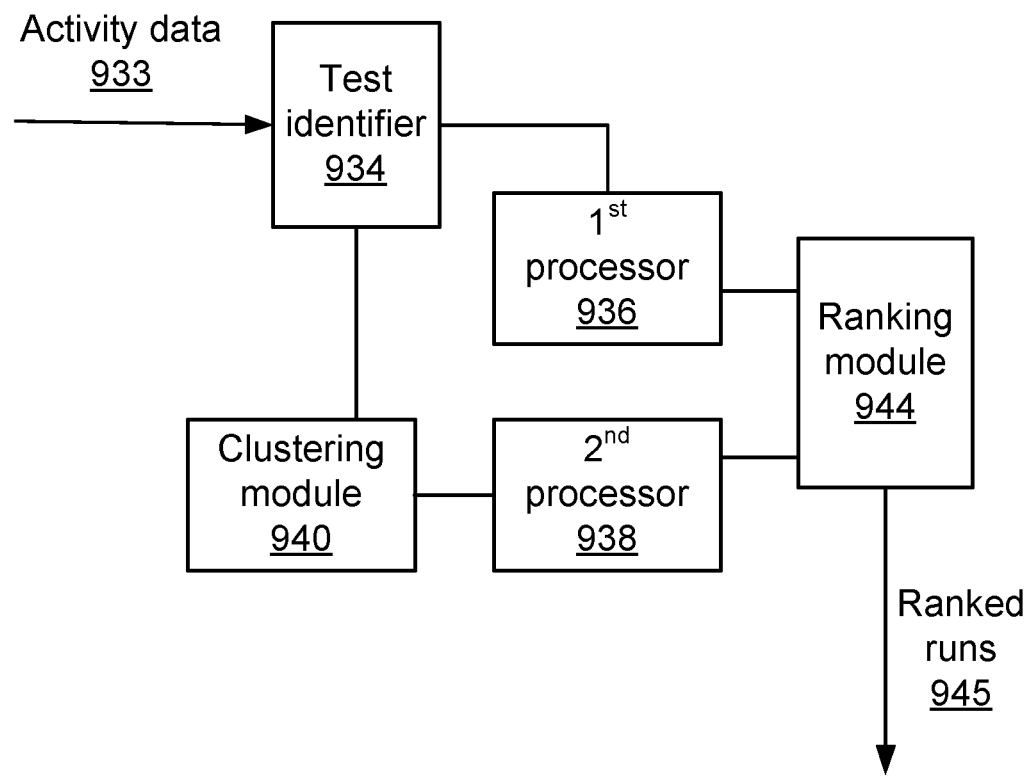
FIG. 5 illustrates one embodiment of a computer system configured to rank runs of test scenarios belonging to a cluster.

FIG. 4 and FIG. 5 illustrate embodiments of a computer system configured to rank runs of test scenarios belonging to a cluster. The illustrated embodiments include at least a test identifier 934, a first processor 936, a clustering module 940, a second processor 938, and a ranking module 944. Optionally, the first processor 291 and the second processor 294 are the same processor.

The test identifier 934 is configured to identify runs of test scenarios run by users belonging to different organizations on software systems that belong to the different organizations. Optionally, the runs are identified based on activity data 933 obtained from monitoring the users. Optionally, each test scenario involves executing at least one transaction, and each transaction is instantiated from a transaction type.

Herein, by stating that a transaction is instantiated from a certain transaction type or that the transaction is an instantiation of a certain transaction type, it is meant that the transaction may be classified as being of the certain transaction type. All transactions that are instantiations of the same transaction type are similar. For example, transactions that are instantiations of the same transaction type may perform similar actions, contain similar code, and/or utilize similar values. Optionally, where clear from the context, a transaction type may be referred to as a "transaction".

In one example, a transaction type involves accepting a customer order. The transaction type defines a certain screen with fields relevant to a customer order (e.g., customer details, product details, and/or payment method). After details of a new customer order are entered, the system may processes the order, e.g., by checking whether entered details is consistent and then forwarding the order to the warehouse. In this example, each time a user enters a new customer order and the system processes, that may be considered an instantiation of the "accepting a customer order" transaction type.

In another example, a transaction type involves calculating salary for an employee. The transaction type may have a screen that requires entry of worker details (e.g., worker ID and number of hours worked in the past month). Each calculation of a salary for a different employee may be considered an instantiation of a "salary calculation" transaction type. Similarly, calculating salaries in a different company on a similar system (which may be customized differently), using a similar screen may also be considered an instantiation of the same "salary calculation" transaction type.

The first processor 936 is configured to receive a selection of a certain transaction type, and to calculate, based on the runs of the test scenarios, a first number of different organizations associated with users that ran test scenarios that involve executing a transaction instantiated from the certain transaction type.

In one embodiment, the first processor 936 analyzes the runs of test scenarios and searches for information identifying which transactions are executed in each run. For each identified transaction in a certain run of a test scenario, the first processor 936 determines whether the transaction is an instantiation of the certain transaction type. If it is, the first processor 936 takes notice of an organization associated the certain run of the test scenario. For example, the first processor 936 determines which user ran the certain run and/or to what organization the user who ran the certain run belongs. The first processor 936 may add the organization to a list of organizations that are associated with runs that involve executing a transaction that is an instantiation of the certain transaction type. Finally, the first processor 936 may determine the number of different organizations that appear in the list. This number may be used as the first number of different organizations associated with users that ran test scenarios that involve executing a transaction instantiated from the certain transaction type.

In another embodiment, the selection of the certain transaction type is done, at least in part, according to a profile of a user and/or a certain organization. Optionally, the profile includes information regarding transactions frequently executed by the user and/or users belonging to the certain organization.

The clustering module 940 is configured to cluster the runs of test scenarios to clusters that include similar runs of test scenarios. Optionally, the clustering module 940 provides the second processor 938 with runs of test scenarios belonging to the certain cluster. For example, after receiving a request for the certain cluster, the clustering module 940 provides the runs of test scenarios belonging to the certain cluster. Additionally or alternatively, the clustering module 940 may provide the second processor 938 with indications identifying runs belonging to the certain cluster (e.g., the indications may be unique identifiers such as database entry numbers or file paths).

The second processor 938 is configured to receive a selection of a certain cluster, selected from among the clusters, and to calculate, based on runs of the test scenarios belonging to the certain cluster, a second number of different organizations associated with users that ran test scenarios involving execution of a transaction instantiated from the certain transaction type.

In one embodiment, the second processor 938 analyzes the runs of test scenarios belonging to the certain cluster and searches for information identifying which transactions are executed in each run. For each identified transaction in a certain run of a test scenario belonging to the certain cluster, the second processor 938 determines whether the transaction is an instantiation of the certain transaction type. If it is, the second processor 938 takes notice of an organization associated with the certain run of the test scenario belonging to the certain cluster. For example, the second processor 938 determines which user generated the certain run and/or to what organization the user who generated the certain run belongs. The second processor 938 may add the organization to a list of organizations that are associated with runs belonging to the certain cluster that involve executing a transaction that is an instantiation of the certain transaction type. Finally, the second processor 938 determines the number of different organizations that appear in the list. This number may be used as the second number of different organizations associated with users that ran test scenarios that involve executing a transaction instantiated from the certain transaction type.

The ranking module 944 is configured to rank runs of test scenarios belonging to the certain cluster according to a function of the first number and the second number. Optionally, the function is a monotonic increasing function, i.e., increasing the value of the first number and/or increasing the value of the second number increases the value returned by the function (and according to which the ranking is performed). In one example, the function is the sum of the first and second numbers. In another example, the function gives higher weight to the second number than it does to the first number (e.g., the function ranks according to the sum of the first number and three times the second number).

In some embodiments, various weights in the function for the first and second numbers may reflect different test strategies that may be used when considering which test scenarios to run. For example, increasing the weight of the first number relative to the second, may be indicative of a global test-strategy that favors testing transactions that are generally used by many organizations (and not focusing on transactions that are prevalent in the certain cluster). However, increasing the weight of the second number, with respect to the first number, may be indicative of a cluster-specific test strategy, which focuses on transactions that are prevalent in runs in the certain cluster.

In one embodiment, the function of the first number and the second number is a monotonic increasing function. Thus, increasing the first number and the second number increases the value of the function of the first number and the second number. Additionally, increasing the first number while the second number remains the same, also increases the value of the function of the first number and the second number. Similarly, increasing the second number while the first number remains the same, also increases the value of the function of the first number and the second number. In one example, a monotonic increasing function of the first number and the second number computes the sum of the first number and the second number. In another example, a monotonic increasing function of the first number and the second number computes the sum of the first number and the second number computes the geometric mean of the first number and the second number.

In one embodiment, the system optionally includes a template generator 946 that is configured to utilize at least one of the highest ranked runs of test scenarios belonging to the certain cluster to generate a test scenario template. Additionally, the computer system may also include a data cleaner 948 that is configured to remove proprietary data from the test scenario template.

In one example, the highest ranked runs test scenarios belong to the top 20% of the runs in the certain cluster. In another example, the highest ranked runs are one or more runs that received the highest value given by the function of the first number and the second number.

In one embodiment a data cleaner 948 may be included in the system. The data cleaner 948 is configured to: select a value from the test scenario template, and remove the selected value from the test scenario template if the selected value appears in less than a first predetermined number of the runs of test scenarios in the certain cluster or the selected value appears in runs of test scenarios in the certain cluster that are associated with less than a second predetermined number of different organizations. Both the first predetermined number and the second predetermined number are greater than one.

In another embodiment, the data cleaner 948 may be configured to: select a value from a run of a test scenario; check whether the value appears in at least a first predetermined number of the runs of the test scenarios, identified by the test identifier 934; check whether the value appears in runs of test scenarios, identified by the test identifier 934, which are associated with at least a second predetermined number of different organizations; and if both conditions are positive, enable the test scenario template to utilize the selected value. Optionally, the data cleaner 948 is also configured not to enable the test scenario template to utilize the selected value if at least one of the conditions is negative.

In one embodiment, the computer system also optionally includes a user interface 949 that is configured to suggest to a user to run an instantiation of the test scenario template.

In one embodiment, the computer system also includes a cluster selector 942. Optionally, the cluster selector 942 provides the second processor 938 with the selection of the certain cluster. Optionally, the cluster selector 942 examines clusters generated by the clustering module 940 in order to make the selection of the certain cluster. In one example, the cluster selector 942 receives a profile of a user and/or an organization, and makes the selection of the certain cluster based on the profile. For example, if the profile indicates that a user utilizes a specific transaction in many tests, that cluster selector 942 may select a cluster that contains runs of test scenarios that also utilize the specific transaction. In another example, the cluster selector 942 selects the certain cluster based on statistical information related to the clusters; for example, the size of the clusters and/or the number of organizations associated with runs belonging to the clusters. Optionally, the certain cluster is a cluster that includes runs run by a large number of users and/or includes runs associated with a large number of organizations. Optionally, the certain cluster is that includes runs run by a largest number of users and/or includes runs associated with a largest number of organizations, from among all the clusters.

In some embodiments, the ranking module 944 is also configured to rank runs belonging to the certain cluster, at least in part, according to their connectivity factors. Optionally, computing connectivity factors takes into account how much elements involved in a computation are prevalent among different organization. For example, if a first screen appears only in runs of test scenarios associated with a single organization, this first screen may make smaller contributions to connectivity factor computations, compared to contribution made by a second screen that is utilized by multiple organizations running test scenarios. The fact that the screen is utilized by multiple organizations means that connectivity factor computations based on it are more likely to be accurate with respect to other organizations.

In one embodiment, connectivity factors of runs of test scenarios are computed with respect to number of organizations associated with runs. Optionally, a function computing connectivity factors employs a threshold number of organizations that need to be associated with an element, for it to make a significant contribution towards the connectivity factor. For example, if an element in a run (e.g., a screen) is utilized by a single organization, it makes a small contribution to a connectivity factor of the run, compared to a contribution it would make had the screen been utilized by multiple organizations. Optionally, elements that are utilized by less than two organizations (e.g., they appear only in runs of a single organization) are not utilized for computation of connectivity factors.

In one embodiment, a connectivity factor of a run of a test scenario utilizes a function that assigns a first run, focused on a first element and which processes variations of the first element in multiple phases, a higher rank than a second run, which processes more elements in fewer corresponding processing phases. Optionally, the function takes into account whether the first element and the elements are utilized by more than two organizations.

In another embodiment, a connectivity factor of a run of a test scenario is computed as a function of associations between a screen and a module, and of number of different organizations that utilized the screen and the module. For example, a connectivity factor of a run computed according to associations between a screen and a module may increase if the screen is utilized by multiple organizations and/or the module is utilized by multiple organizations.

As used herein, if a module is tested by a run of a test scenario associated with an organization, the module may be considered utilized by the organization. Similarly, if a screen appears in a run associated with an organization, the screen may be considered utilized by the organization.

In yet another embodiment, a connectivity factor of a run of a test scenario is computed as a function of an amount of data a certain screen, presented during the run, displays from its previous screen in the run, and of the number of different organizations that utilized the certain screen. For example, the more overlap in the data displayed on the certain and previous screens, the higher the connectivity factor. Additionally, the more organizations utilize the certain screen, the higher the connectivity factor attributed to the run.

In still another embodiment, a connectivity factor of a run of a test scenario is computed as a function of number of keystrokes typed by users while still in a screen and of the number of different organizations that utilized the screen. For example, the more keystrokes entered by users on average on a certain screen, the higher the connectivity factor of a run that displayed the certain screen. Additionally, the more organizations utilize the certain screen, the higher the connectivity factor attributed to the run.

In yet still another embodiment, a connectivity factor of a run of a test scenario is computed by associating programs with modules, logging which programs are executed, and calculating the connectivity factor as a function of jumps between modules and the number of organizations that utilized the modules. For example, the more jumps between modules in the run (as evident by switching between execution of programs associated with different modules), the lower the connectivity factor of the run. Additionally, the more organizations utilize the modules, the higher the connectivity factor attributed to the run.

Monitoring users running test scenarios typically produces a large number of runs of test scenarios that may be utilized, among other uses, to generate test scenario templates. Given the diversity typically observed in runs of test scenarios, it is likely that not all runs will be equally useful for generating test scenario templates. Furthermore, templates generated from different runs may be of varying levels of usefulness for other users. One type of aspect that may provide insight towards the usefulness of a run of a test scenario and/or the usefulness of a template generated from the run is connectivity factor of the test scenario.

A connectivity factor of a test scenario is a property indicative of an extent the test scenario is focused on elements being tested by it. A high connectivity factor indicates that the test scenario focuses primarily on a small set of elements, while a low connectivity factor indicates that the test scenario is spread out, focusing on many elements, but focusing on each of the many elements only to a small degree.

As used herein, a connectivity factor may be attributed to a test scenario and/or to a run of a test scenario. If attributed to the run of the test scenario, then the connectivity factor is computed, at least in part, based on the run of the test scenario (e.g., a number of screens visited by a user during the run). Thus, different runs of a certain test scenario may have different connectivity factors for the certain test scenario, computed based on characteristics of each run. Note that how a connectivity factor for a certain test scenario is computed (see examples below), may influence how susceptible the computation of the connectivity factor is to variations between different runs of the test scenario.

In some embodiments, it is beneficial to generate test scenario templates from runs of test scenarios with high connectivity factors. Having a high connectivity factor means that it is likely that elements tested by a test scenario are well covered by the test scenario, e.g., various aspects of the elements are tested since the test scenario dwells on them relatively a lot. Conversely, having a low connectivity factor means that it is likely that elements tested by a test scenario are only cursorily treated by the test scenario. Thus, in order to effectively and thoroughly test elements, it is better to run test scenarios that cover the elements and have high connectivity factors. Utilizing test scenarios with high connectivity factors also reduces the number of test scenarios that are required to test a certain element, which also reduces that time and/or expense of testing the certain element.

There are various connectivity factors that may be calculated for a test scenario. Each connectivity factor may examine various aspects of the test scenario, a run of the test scenario, and/or the system. Below are some examples of embodiments that calculate connectivity factors.

In one embodiment, a test scenario includes several phases of execution. By examining the test scenario and/or a run of the test scenario, a focus of the test scenario may be determined, for at least some of the phases. Optionally, a phase includes one or more transactions that may involve certain system elements. In one example, connectivity factors are computed by identifying which element (or elements) is being processed during a certain phase of a test, and how many phases of the test are spent on each element or variations of the element. Examples of elements may be business processes and/or screens, or system elements such as databases and/or servers. Thus, a test scenario that is focused around a first element and processes variations of the first element in multiple phases, has a higher connectivity factor than a second test scenario that processes more elements in fewer corresponding processing phases.

In another embodiment, a connectivity factor of a test scenario is computed utilizing a function of associations between screens visited when running the test scenario and system modules. For example, if a certain test scenario involves screens associated with several modules, it may have a lower connectivity factor than another test scenario that involves screens associated with a single system module. In this example, the connectivity factor may relate to how much a test scenario is focused on a small set of modules.

In yet another embodiment, a connectivity factor is a function of amount of data a certain screen displays, which was also displayed in a previously displayed screen. Running a test scenario often involves a user visiting a series of screens. Having a second screen relate to much of the data in a first screen, which appeared previously to the second screen, may be an indication of a high connectivity factor for the test scenario. The fact that there is overlap between the data addressed in screens means that the elements (e.g., fields and/or business processes) to which the data is related are covered in multiple screens. This means that the elements may be tested more thoroughly by such a test scenario, compared to a test scenario in which there is a small amount of data displayed in a second screen that comes from a previously displayed first screen. An example of a function that may be used computing a connectivity factor of a test scenario may be the average number of screens from the test scenario an average field appears in. Another example of a function for a connectivity factor for a test scenario may be the percentage of fields in screens of a test scenario that appear in multiple screens.

In still another embodiment, a connectivity factor of a test scenario is based on monitoring keystrokes of users running the test scenario. The connectivity factor may be a function of the number of keystrokes typed in each screen. For example, a high number of keystrokes, on average per screen, may be attributed a high connectivity factor since it indicates that the test scenario dwells a lot on each screen; thus, if a user dwells on a screen, numerous aspects of the screen may be tested. In contrast, entering a small number of keystrokes per screen, on average, may indicate that few aspects of a screen may be tested; hence, the corresponding test scenario may be awarded a low connectivity factor.

In yet still another embodiment, calculating a connectivity factor involves associating programs to modules, logging which programs are executed, and taking note of switches of programs associated with different modules. For example, the more a running of a test scenario involves running of programs associated with a same module, the higher the connectivity factor of the test scenario may be. If many programs run in the test scenario are associated with the same module, it may mean that various aspects of the module are tested by the test scenario. In contrast, if running a test scenario involves running various programs associated with different modules, this may mean that an individual module is not well covered by the test scenario, and only a small number of aspects of the individual module may be tested.

It is to be noted that different embodiments may implement components of the computer system illustrated in FIG. 4 and/or FIG. 5 in different ways. For example, in some embodiments one or more of the following may be implemented by the same software module and/or software modules running on the same processor: the monitoring module 932, test identifier 934, the clustering module 940, the cluster selector 942, the ranking module 944, the template generator 946, the data cleaner 948, and the user interface 949. Optionally, one or more of the aforementioned components may involve software that runs on the first processor 936 and/or on the second processor 938. Additionally, one or more of the aforementioned components may be implemented on a remote server, such as a cloud-based server. Optionally, the first processor 936 may be the second processor 938. Optionally, the first processor 36 and/or the second processor 938 are located on a remote server that does not belong to any of the different organizations. For example, the remote server may be a cloud-based server.

In one example, the data cleaner 948 is implemented as part of the template generator 946. In another example, the clustering module 940 and the cluster selector 942 are both implemented by the same software module. In yet another example, the clustering module 940 and/or the cluster selector 942 involve software that is executed on the first processor 936 and/or the second processor 938.

In one embodiment, the clustering module 940, cluster selector 942, and/or ranking module 944, are implemented as a cloud-based service that receives runs of test scenarios identified from the activity data 933 of the users 930 belonging to the different organizations, and ranks at least some of the runs 945. Optionally, the template generator 946, the test identifier 934, and/or the data cleaner 948 may also be part of the cloud-based service.

Figure 6:
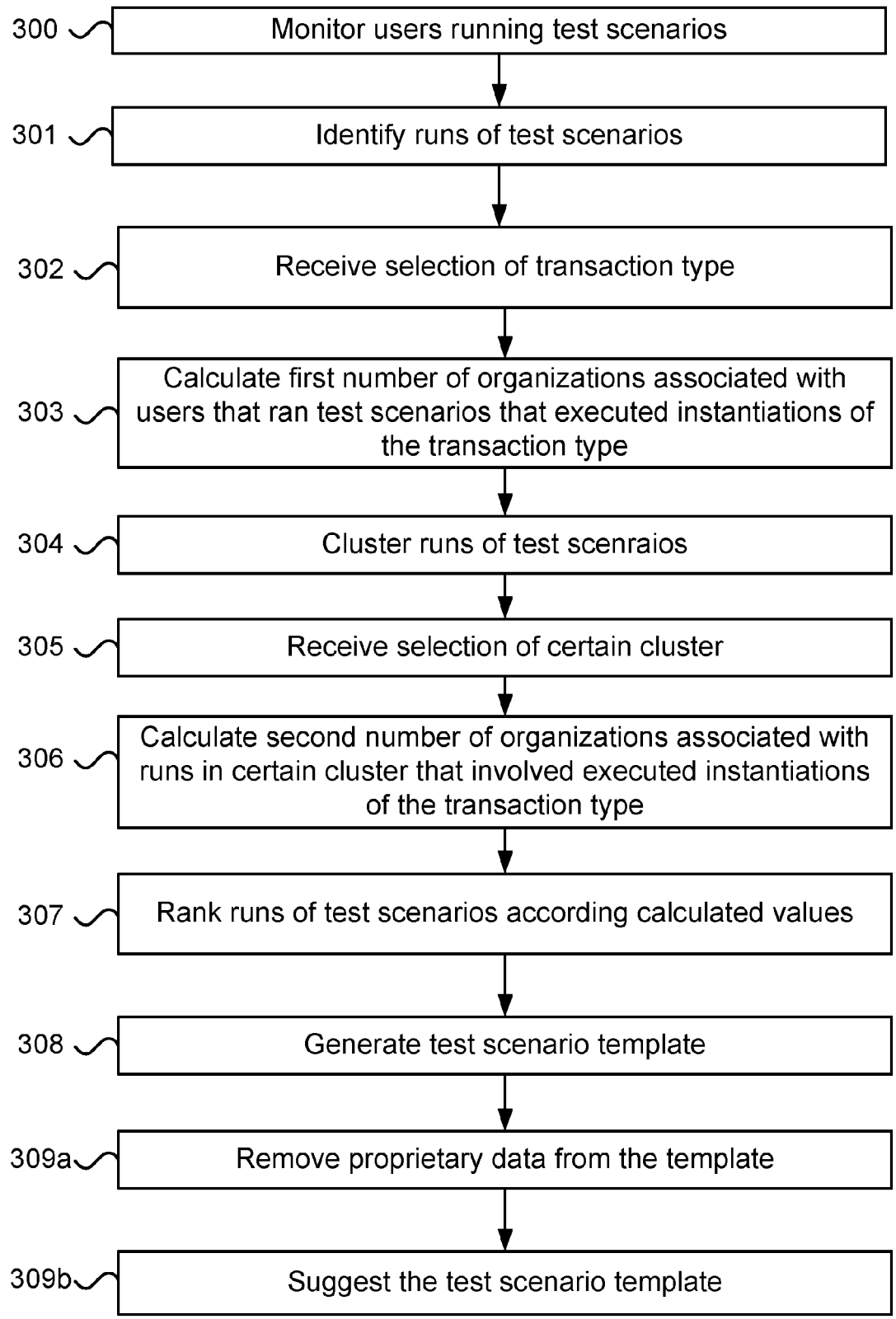
FIG. 6 illustrates one embodiment of a computer implemented method for ranking runs of test scenarios belonging to a cluster of similar runs.

FIG. 6 illustrates one embodiment of a computer implemented method for ranking runs of test scenarios belonging to a cluster of similar runs. The illustrated embodiment includes the following steps:

In step 301, identifying runs of test scenarios run by users belonging to different organizations on software systems belonging to the different organizations. Each test scenario involves running at least one transaction, and each transaction is instantiated from a transaction type.

In step 302, receiving a selection of a certain transaction type.

In step 303, calculating, based on the runs of the test scenarios, a first number of different organizations associated with users that ran test scenarios involving execution of a transaction instantiated from the certain transaction type.

In step 304, clustering the runs of test scenarios to clusters comprising similar runs of test scenarios.

In step 305, receiving a selection of a certain cluster from among the clusters.

In step 306, calculating a second number of different organizations that are associated with users that ran test scenarios that both belong to the certain cluster and involve execution of a transaction instantiated from the certain transaction type.

And in step 307, ranking runs of test scenarios belonging to the certain cluster according to a function of the first number and the second number.

In one embodiment, ranking runs of test scenarios belonging to the certain cluster involves imposing an ordering on at least some of the runs of test scenarios belonging to the certain cluster. This means, that for at least a first run and a second run belonging to the certain cluster, the ranking indicates whether the first run should be ranked higher than the second run, or vice versa. Optionally, the ranking is given in a form of a permutation of some of the runs. Optionally, the ranking is given in a form of ordered pairs of first and second runs, designating for the first and the second runs in the pair that the first run should be ranked higher than the second run.

In another embodiment, ranking runs of test scenarios belonging to the certain cluster involves computing the function of the first number and the second number for at least some of the runs belonging to the certain cluster. Optionally, the function values are computed for a first run and a second run belonging to the certain cluster, such that, based on the computed function values for the first run and the second run, an order may be imposed on the first and second runs. For example, based on the function values, it may be determined that the first run, which has a higher function value than the second run, should be ranked higher than the second run.

Ranking runs of test scenarios need not necessarily involve ranking all the runs belonging to the certain cluster. In some embodiments, ranking runs of test scenarios belonging to the certain cluster involves determining the function value for only some of the runs; thus, for some of the runs a ranking may not be determined. Additionally or alternatively, an order indicated by ranking may be a partial order, which does not resolve for all pairs of runs of test scenarios, which of runs in a pair should be ranked higher. In some embodiments, multiple runs belonging to the certain cluster may receive an identical function value, indicating that they are ranked the same.

In one embodiment, the computer implemented method includes optional step 308 which involves utilizing at least one of the highest ranked runs of test scenarios for generating a test scenario template that represents similar runs of test scenarios in the certain cluster. In one example, the highest ranked runs test scenarios belong to the top 20% of the runs in the certain cluster. Optionally, the computer implemented method also includes optional steps involving recording a user while running a certain test scenario; identifying that the certain test scenario is similar to the generated test scenario template; and suggesting the user to run an instantiation of the test scenario template. Optionally, the computer implemented method also includes an optional steps involving selecting a value from the test scenario template, and removing the selected value from the test scenario template if the selected value appears in less than a first predetermined number of runs in the selected cluster or the selected value appears in description of runs in the selected cluster that are associated with less than a second predetermined number of different organizations. Both the first predetermined number and the second predetermined number are greater than one. Optionally, the computer implemented method also includes optional steps involving selecting a value from a description of run in the selected cluster, testing whether the value appears in at least a first predetermined number of runs in the selected cluster, testing whether the value appears in description of runs in the selected cluster that are associated with at least a second predetermined number of different organizations, and if both conditions are positive, enabling the test scenario template to utilize the selected value. Optionally, the computer implemented method also includes optional step involving not enabling the test scenario template to utilize the selected value if at least one of the aforementioned conditions is negative.

In one embodiment, the computer implemented method includes optional step 300, which involves monitoring the users belonging to different organizations and providing data collected in the monitoring to be used for the identifying of the runs of test scenarios.

In one embodiment, the computer implemented method illustrated in FIG. 6 includes an optional step which involves customizing the test scenario template for a user by adding to the test scenario template proprietary data relevant to the user.

In one embodiment, the computer implemented method includes optional step 309a which involves removing proprietary data from the template by selecting a value from the test scenario template, and removing the selected value from the test scenario template if the selected value appears in less than a first predetermined number of runs in the selected cluster or the selected value appears in description of runs in the selected cluster that are associated with less than a second predetermined number of different organizations. Optionally, both the first predetermined number and the second predetermined number are greater than one.

In one embodiment, the computer implemented method includes step 309b which involves suggesting to a user to run an instantiation of the test scenario template. Optionally, the user interface 949 is utilized to suggest to the user to run the instantiation of the template. Optionally, the template is customized prior to suggesting to the user.

In one embodiment, ranking the runs of test scenarios belonging to the certain cluster is done according to connectivity factors of the runs, computed with respect to number of organizations associated with runs. Optionally, the ranking abides by a principal that a first run, focused on a first element, which processes variations of the first element in multiple phases, and is utilized by at least two different organizations, receives a higher rank than a second run, which processes more elements in fewer corresponding processing phases, and the elements are utilized by at least two different organizations. Optionally, calculating the connectivity factor is a function of associations between a screen and a module and number of different organizations that utilized the screen and the module. Optionally, calculating the connectivity factor is a function of amount of data a certain screen displays from its previous screen and number of different organizations that utilized the certain screen. Optionally, calculating the connectivity factor is a function of number of keystrokes typed by users while in a certain screen, and of number of different organizations that utilized the certain screen. Optionally, calculating the connectivity factor involves associating programs with modules, logging which programs are executed, and calculating the connectivity factor as a function of jumps between modules and the number of organizations that utilized the modules In one embodiment, a non-transitory computer-readable medium stores program code that may be used by a computer to rank runs of test scenarios belonging to a cluster. The computer includes a processor, and the non-transitory computer-readable medium stores the following program code:

Program code for identifying runs of test scenarios run by users belonging to different organizations on software systems belonging to the different organizations.

Program code for a receiving selection of a certain transaction type.

Program code for calculating, based on the runs of the test scenarios, a first number of different organizations associated with users that ran test scenarios involving execution of a transaction instantiated from the certain transaction type.

Program code for clustering the runs of test scenarios to clusters comprising similar runs of test scenarios.

Program code for receiving a selection of a certain cluster from among the clusters.

Program code for calculating a second number of different organizations that are associated with users that ran test scenarios that both belong to the certain cluster and involve execution of a transaction instantiated from the certain transaction type.

And program code for ranking runs of test scenarios belonging to the certain cluster according to a function of the first number and the second number.

In one embodiment, the non-transitory computer-readable medium stores program code for utilizing at least one of the highest ranked runs of test scenarios for generating a test scenario template that represents similar runs of test scenarios in the certain cluster.

In one embodiment, the non-transitory computer-readable medium stores program code for monitoring the users belonging to different organizations and providing data collected in the monitoring to be used for the identifying of the runs of test scenarios.

In one embodiment, the non-transitory computer-readable medium stores program code for customizing the test scenario template for a user by adding to the test scenario template proprietary data relevant to the user.

In one embodiment, the non-transitory computer-readable medium stores program code for removing proprietary data from the template by selecting a value from the test scenario template, and removing the selected value from the test scenario template if the selected value appears in less than a first predetermined number of runs in the selected cluster or the selected value appears in description of runs in the selected cluster that are associated with less than a second predetermined number of different organizations. Optionally, both the first predetermined number and the second predetermined number are greater than one.

In one embodiment, the non-transitory computer-readable medium stores program code for suggesting to a user to run an instantiation of the test scenario template.

Figure 7:
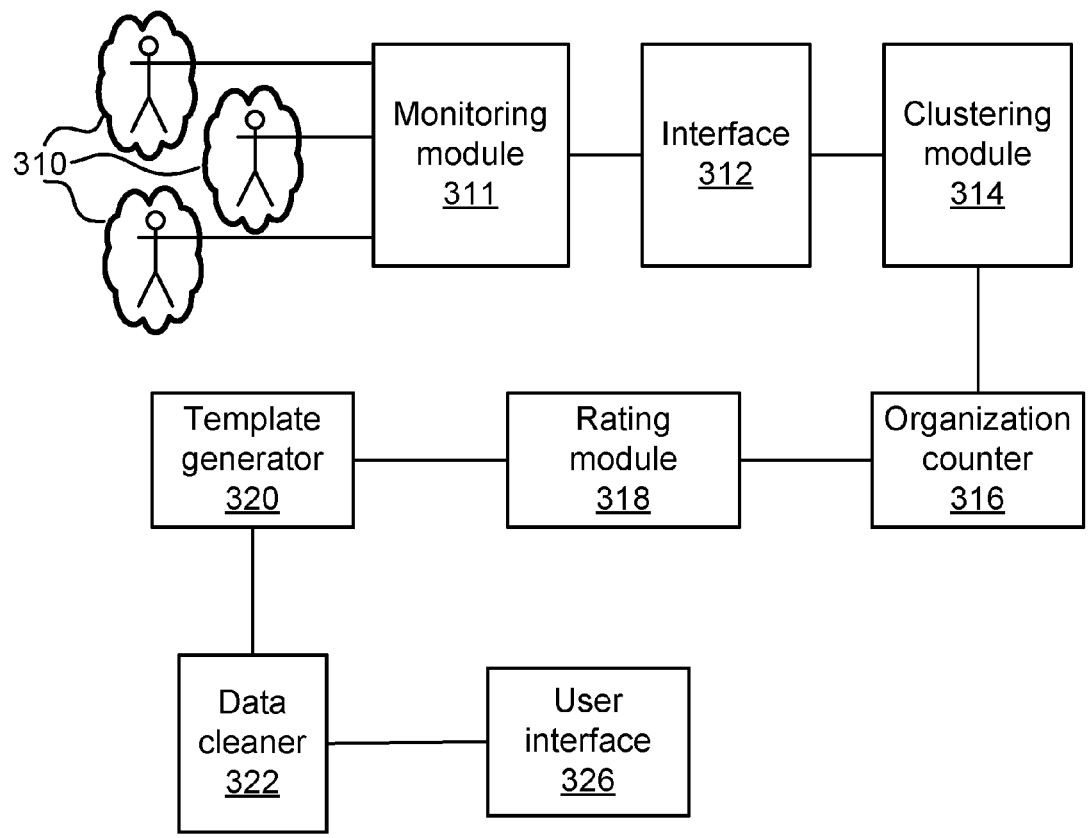
FIG. 7 illustrates one embodiment of a computer system configured to rate popularity of a cluster of runs of test scenarios.

FIG. 7 illustrates one embodiment of a computer system configured to rate popularity of a cluster of runs of test scenarios. The illustrated embodiment includes at least interface 312, a clustering module 314, an organization counter 316, and a rating module 318.

The interface 312 is configured to receive runs of test scenarios run by users belonging to different organizations essentially on same packages of software systems. Herein, the limitation "essentially on same packages of software systems" covers packages of the same type which may or may not feature different customizations, such as SAP setup files, and/or Oracle customization code.

The clustering module 314 is configured to cluster the runs into clusters that include similar runs of test scenarios. Optionally, the clustering module is configured to process one or more of the following logged activities: list of users who ran the test scenarios, analysis of access to a database, messages returned from executed transactions, values returned by fields, and procedures utilized by a test scenario.

The organization counter 316 is configured to count a number of different organizations associated with a cluster; an organization is considered associated with a certain cluster if the certain cluster includes a run of a test scenario run by a user belonging to the organization.

And the cluster rating module 318 configured to compute popularity ratings of at least some of the clusters based on the number of different organizations associated with the clusters. The computed popularity ratings follow a rule that the higher the number of different organizations associated with a cluster, the higher the popularity rating of the cluster.

In one embodiment, the cluster rating module 318 is also configured to count number of common input fields in a cluster. A common input field in a cluster is an input field used by at least a predetermined percentage of the runs in the cluster. The cluster rating module 318 is also configured to adjust the popularity rating of a cluster to reflect the percentage of common input fields in the cluster; the more common input fields in runs belonging to a cluster, the higher the popularity rating of the cluster.

In one embodiment, computing popularity ratings of at least some of the clusters results in imposing an ordering of at least some of the clusters. This means that for at least a first cluster and a second cluster, the popularity ratings indicate whether the first cluster should be rated higher than the second cluster, or vice versa. Optionally, the popularity rating is given in a form of a permutation of some of the clusters. Optionally, the popularity rating is given in a form of ordered pairs of first and second clusters, designating for a first cluster and a second cluster in a pair, that the first cluster should be placed higher than the second cluster.

In another embodiment, popularity ratings of at least some clusters are given as function values associated with the at least some of the clusters. Optionally, a popularity rating of a cluster is a function of the number of different organizations associated with the cluster. Optionally, the popularity ratings are computed for a first cluster and a second cluster, such that, based on the computed values for the first cluster and the second cluster, an order may be imposed on the first and the second clusters. For example, based on the values, it may be determined that the first cluster, which has a higher value than the second cluster, should be placed higher than the second cluster.

Computing popularity rating of clusters need not necessarily involve computing popularity rating for all the clusters generated by the clustering module 314. For example, some clusters may be ignored due to their size and/or association of their runs with too few organizations. Optionally, computing popularity ratings of clusters is done only for some of the clusters. Optionally, multiple clusters may have an identical popularity rating value, indicating that they are rated the same.

In one embodiment, the computer system includes an optional template generator 320 that is configured to generate a test scenario template based on at least one run of a test scenario from a cluster with a high popularity rating. Optionally, the computer system may include a user interface 326 that is configured to suggest to a user to run an instantiation of the test scenario template. The test scenario template may identify a transaction used by the at least one run of a test scenario belonging to the cluster with a high popularity rating, and possible values for running the transaction. Optionally, the template generator 320 is configured to generate the test scenario template based on at least two runs of test scenarios belonging to the cluster with the highly popularity rating. Additionally, the at least two runs were run by users associated with different organizations. Optionally, the test scenario template includes a combination of the possible values, and the combination does not appear in any of the at least two runs of test scenarios.

In one embodiment, the computer system includes an optional data cleaner 322 that is configure to select a value from the test scenario template, and remove the selected value from the test scenario template if the selected value appears in less than a first predetermined number of runs belonging to the cluster with the high popularity rating, or runs belonging to the cluster with the high popularity rating that include the selected value are associated with less than a second predetermined number of different organizations. Additionally, both the first predetermined number and the second predetermined number are greater than one.

In another embodiment, the data cleaner 322 is configured to select a value from a run of a test scenario in the cluster with the high popularity rating, and test whether the value appears in at least a first predetermined number of runs of test scenarios in the cluster with the high popularity rating. Additionally, the data cleaner 322 is configured to also test whether the value appears in runs in the cluster with the high popularity rating that are associated with at least a second predetermined number of different organizations. If both conditions are positive, the data cleaner 322 is to enable the test scenario template to utilize the selected value. Optionally, value if at least one of the conditions is negative, the data cleaner 322 is configured not to enable the test scenario template to utilize the selected value.

In one embodiment, the computer system also includes a monitoring module 311. The monitoring module is configured monitor the users 310 belonging to the different organizations and to identify the runs of the test scenarios of the users 310 belonging to different organizations, essentially on same packages of software systems. Optionally, the runs of the test scenarios are provided to the interface 312.

It is to be noted that different embodiments may implement components of the computer system illustrated in FIG. 7 in different ways. For example, in some embodiments one or more of the following may be implemented by the same software module and/or software modules running on the same processor: the monitoring module 311, the interface 312, the clustering module 314, the organization counter 316, the rating module 318, the template generator 320, the data cleaner 322, and the user interface 326. Optionally, one or more of the aforementioned components may be implemented on a remote server, such as a cloud-based server.

In one example, the data cleaner 322 is implemented as part of the template generator 320. In another example, the clustering module 314 and the organization counter 316 are both implemented by the same software module. In yet another example, the rating module 318 is implemented as part of the clustering module 314.

In one embodiment, the interface 312, the clustering module 314, the organization counter 316, and/or rating module 318, are implemented as a cloud-based service that receives runs of test scenarios identified from monitoring of the users 310 belonging to the different organizations, and rates at least some of the clusters. Optionally, the template generator 320 and/or the data cleaner 322 may also be part of the cloud-based service.

Figure 8:
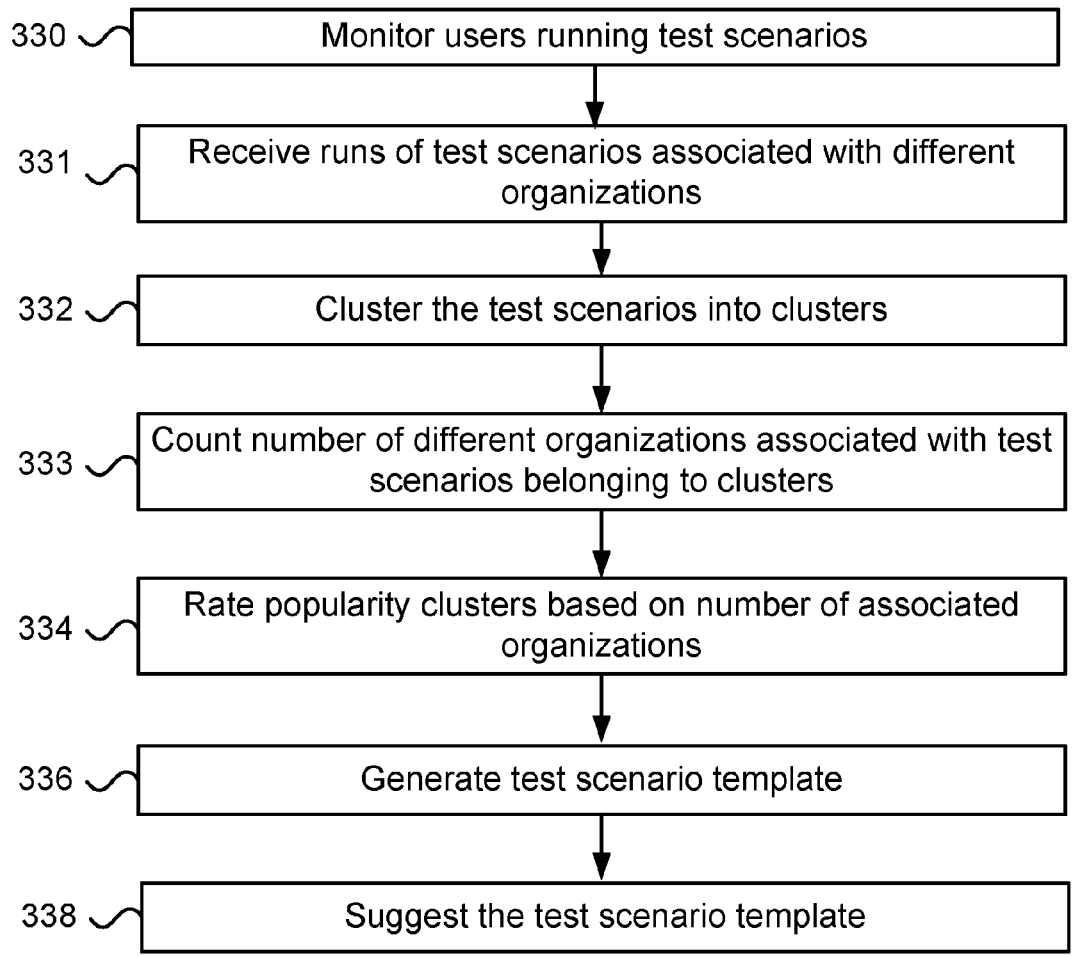
FIG. 8 illustrates one embodiment of a computer implemented method for rating popularity clusters of runs of test scenarios.

FIG. 8 illustrates one embodiment of a computer implemented method for rating popularity clusters of runs of test scenarios. The illustrated embodiment includes the following steps:

In step 331, receiving runs of test scenarios run by users from different organizations essentially on same packages of software systems.

In step 332, clustering the runs into clusters comprising similar runs of test scenarios.

In step 333, counting number of different organizations associated with the clusters; an organization is associated with a cluster if a user belonging to the organization runs a test scenario belonging to the cluster.

And in step 334, computing popularity ratings of at least some of the clusters based on number of different organizations associated with each of the clusters; wherein the higher the number of different organizations associated with a cluster, the higher the popularity rating of the cluster.

In one embodiment, the computer implemented method includes optional step 330 which involves monitoring the users running the test scenarios on the software systems that belong to the different organizations in order to identify the runs of the test scenarios. Optionally, the runs of the test scenarios are received by the interface 312.

In one embodiment, the computer implemented method includes optional step 336 which involves generating a test scenario template based on at least one run of a test scenario from a cluster with a high popularity rating. Optionally, the test scenario template identifies a transaction used by the at least one run of a test scenario belonging to the cluster with the high popularity rating, and possible values for running the transaction. In one example, a high popularity rating is a popularity rating that places a cluster in the top 20% of the clusters, i.e., 80% of the clusters have a lower popularity rating. In another example, a high popularity rating is the highest popularity rating value given to any of the clusters.

In one embodiment, generating the test scenario template in optional step 336 is based on at least two runs of test scenarios belonging to the cluster with the high popularity rating. Optionally, the at least two runs are run by users associated with different organizations. Optionally, the test scenario template identifies a transaction used by the at least one of the at least two runs of test scenarios, and possible values for running the transaction. Additionally, the test scenario template may include a combination of the possible values, and the combination does not appear in any of the at least two runs of test scenarios.

In one embodiment, the computer implemented method illustrated in FIG. 8 includes an optional step involving selecting a value from the test scenario template, and removing the selected value from the test scenario template if the selected value appears in less than a first predetermined number of runs of test scenarios in the cluster with the high popularity rating. Additionally or alternatively, the optional step involves removing the selected value from the test scenario template if the selected value appears in runs of test scenarios in the cluster with the high popularity rating that are associated with less than a second predetermined number of different organizations. Optionally, both the first predetermined number and the second predetermined number are greater than one.

In another embodiment, the computer implemented method illustrated in FIG. 8 includes an optional step involving selecting a value from a run of a test scenario in the cluster with the high popularity rating, testing whether the value appears in at least a first predetermined number of runs of test scenarios in the cluster with the high popularity rating. Additionally, the step involves testing whether the value appears in runs in the cluster with the high popularity rating that are associated with at least a second predetermined number of different organizations, and if both conditions are positive, enabling the test scenario template to utilize the selected value. Optionally, if at least one of the conditions is negative the test scenario template is not allowed to utilize the selected value.

In one embodiment, the computer implemented method includes step 338 which involves suggesting to a user to run an instantiation of the test scenario template. Optionally, the user interface 298 is utilized to suggest to the user to run the instantiation of the template. Optionally, the template is customized prior to suggesting to the user.

In one embodiment, the computer implemented method illustrated in FIG. 8 includes an optional step that involves counting a number of common input fields in clusters. A common input field in a cluster is an input field used by at least a predetermined percentage of the runs in the cluster. Additionally, the computer implemented method illustrated in FIG. 8 includes an optional step that involves adjusting the popularity rating of a cluster to reflect the percentage of common input fields in the cluster. The more common input fields in runs in a cluster, the higher the popularity rating of the cluster. In one example, the popularity rating of a cluster is multiplied by the percentage of common input fields in the cluster.

In one embodiment, a non-transitory computer-readable medium stores program code that may be used by a computer to rate popularity of clusters of runs of test scenarios. The computer includes a processor, and the non-transitory computer-readable medium stores the following program code:

Program code for receiving runs of test scenarios run by users from different organizations essentially on same packages of software systems.

Program code for clustering the runs into clusters comprising similar runs of test scenarios.

Program code for counting number of different organizations associated with the clusters; an organization is considered associated with a cluster if a user belonging to the organization runs a test scenario belonging to the cluster.

And program code for rating popularity of the clusters based on number of different organizations associated with each of the clusters; the higher the number of different organizations associated with a cluster, the higher the popularity rating of the cluster.

In one embodiment, the non-transitory computer-readable medium also stores program code for monitoring the users running the test scenarios on the software systems that belong to the different organizations in order to identify the runs of the test scenarios.

In one embodiment, the non-transitory computer-readable medium also stores program code for generating a test scenario template based on at least one run of a test scenario from a cluster with a high popularity rating. Optionally, the test scenario template identifies a transaction used by the at least one run of a test scenario belonging to the cluster with the high popularity rating, and possible values for running the transaction.

Optionally, the non-transitory computer-readable medium also stores program code for generating of the test scenario template based on at least two runs of test scenarios belonging to the cluster with the high popularity rating; and wherein the at least two runs were run by users associated with different organizations. Optionally, the test scenario template identifies a transaction used by the at least one of the at least two runs of test scenarios, and possible values for running the transaction; and wherein the test scenario template includes a combination of the possible values, and the combination does not appear in any of the at least two runs of test scenarios.

In one embodiment, the non-transitory computer-readable medium also stores program code for selecting a value from the test scenario template, and removing the selected value from the test scenario template if the selected value appears in less than a first predetermined number of runs of test scenarios in the cluster with the high popularity rating or the selected value appears in runs of test scenarios in the cluster with the high popularity rating that are associated with less than a second predetermined number of different organizations. Optionally, both the first predetermined number and the second predetermined number are greater than one.

In one embodiment, the non-transitory computer-readable medium also stores program code for suggesting to a user to run an instantiation of the test scenario template.

In one embodiment, the non-transitory computer-readable medium also stores program code for counting number of common input fields in the selected cluster. A common input field in a cluster is an input field used by at least a predetermined percentage of the runs in the cluster. Additionally, the non-transitory computer-readable medium also stores program code for adjusting the popularity rating of a cluster to reflect the percentage of common input fields in the cluster; the more common input fields in runs in a cluster, the higher the popularity rating of the cluster.

Monitoring Users and Identifying Runs

Some of the disclosed embodiments involve software systems that may be characterized as being data-oriented large-scale software systems. Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems. Installing, upgrading, and/or maintaining such systems require running many tests in order to validate the systems' behavior.

In this disclosure, users are often referred to as being monitored. This monitoring typically concerns activity of the user on a software system being tested. A monitored user may be a human (e.g., performing a certain test) and/or a system module (e.g., a module initiating the running of a certain procedure).

In one embodiment, a test scenario refers to a functional and/or a technical specification for testing a business process and/or one or more transactions. A test scenario may specify how to test one or more business processes, business requirements, test conditions, logical data, and/or expected results of tests.

In one embodiment, runs of test scenarios are identified and/or obtained based on data collected from monitoring users. For example, monitoring of a user may involve collection of data related to inputs provided by a user to a system, along with the transactions that were run, and results of the transactions. This data may be used to identify runs of test scenarios that describe test steps taken by a user and a result of executing the test steps on the software system.

In another embodiment, monitoring a user is done in order to obtain activity data of a user on a software system. The activity data may include data related to inputs provided by the user and/or other sources to the software system, outputs generated by the software system, and/or intermediate values generated by the software system (e.g., temporary files generated by the system, network traffic of the system, and/or content of memory belonging to the system). Optionally, the activity data may be utilized in order to identify runs of test scenarios.

In some embodiments, users perform at least part of their interaction with a software system via a user interface that includes a display that displays screens. Optionally, a screen may refer to a presentation of a certain form through which a user may access, modify and/or enter data. Optionally, a screen includes one or more fields. Optionally, a field may have a certain name and/or identifier. Optionally, a field may have an associated value, which may be referred to herein as a "field value". The field value may or may not be presented on the screen. Optionally, the user is able to edit certain field values, while other field values may not be editable by the user. Optionally, certain field values may be required values, which the user must enter before completing a screen. Optionally, field values from a screen may correspond to one or more database entries. For example, a screen displaying customer details (e.g., name, address, telephone number) may correspond to a record of the customer in a customer database.

In one embodiment, monitoring users involves monitoring certain transactions and/or business processes that were executed by the users, as part of running test scenarios. Optionally, monitoring users may involve monitoring which programs executed by the users, along with invocation values of the users and/or return values of the programs.

In one embodiment, monitoring a user may involve recording and/or processing inputs the user provides to the software system (e.g., via a keyboard, mouse click, visual cue). Additionally or alternatively, the inputs may include digital data transmitted to the system (e.g., a file of digital data). In another example, monitoring a user may involve recording and/or processing outputs generated by the software system. Such outputs may include, values presented on a screen, written in a file, printed, and/or provided in the form of auditory cues. The outputs may be presented to the user and/or provided to other recipients. In yet another example, monitoring a user may involve utilization of internal state data of the software system; data that may not have been directly provided by the user and may also not be directly provided to the user (e.g., memory content, database activities, and/or network traffic).

In some embodiments, users performing tests may be given instructions and/or scripts describing some of the steps involved in a certain test (e.g., which procedures to run, what buttons to push, and/or what values to provide the system). Optionally, such instructions and/or scripts may be given in electronic form (e.g., a computer file or instructions on a screen) and may be recorded and/or processed as part of monitoring a user.

As described in some embodiments in this disclosure, monitoring a user running test scenarios on a software system may be performed by a monitoring module. Optionally, the monitoring module is, and/or utilizes, a software module that interacts with the software system on which the test scenarios are run, in order to obtain data related to activity of the user on the software system. Optionally, the monitoring module is implemented, at least in part, as part of the software system. For example, the monitoring module may include one or more programs that are part of a distribution of the software system. Additionally or alternatively, the monitoring module may be implemented, at least in part, separately from the software system. For example, the monitoring module may include programs that are not part of the software system (e.g., not included in a distribution of the software system). In another example, the monitoring module may include programs that run on hardware that does not run the programs belonging to the software system; e.g., the monitoring module may run programs on different servers than servers on which the software system runs programs. Optionally, the monitoring module is implemented, at least in part, on hardware remote from hardware that runs the software system. For example, a software system may run on hardware located at a certain organization, while the monitoring module may run, at least in part, on remote cloud-based servers that are not associated with the certain organization.

In some embodiments, the monitoring module may receive data from the software system that is intended for the monitoring module (e.g., the software system may explicitly send the monitoring module data describing activity on the software system). Additionally or alternatively, the monitoring module may intercept and/or examine data of the software system that is not intended primarily for the monitoring module. For example, the monitoring module may sniff network traffic that involves message exchange between modules of the software system as part of the normal operation of the software system.

In some embodiments, a run of a test scenario may include identifiers of business processes, transactions, and/or system commands that were executed while running the test scenario. Additionally or alternatively, a run of a test scenario may include values that were provided to a software system (e.g., input values in a screen), values generated by the software system (e.g., outputs from a transaction), and/or internal values of the software system (e.g., intermediate values generated by a transaction). Additionally or alternatively, a run of a test scenario may include state information about systems involved in running the test scenario (e.g., the state of certain system resources, and/or performance data such as CPU load or network congestion), and/or information about a user running the test scenario (e.g., organization affiliation, department, job title, permissions). Optionally, a certain test step, transaction, command or procedure is said to be described and/or included in a run of a test scenario if the run of the test scenario indicates that the certain test step, transaction, command, or procedure was executed as part of running the test scenario. Optionally, examining the run of the test scenario may reveal a value associated with the certain test step, transaction, command, or procedure. Additionally, examining the run of the test scenario may reveal a behavior of the system with respect to the certain test step, transaction, command, or procedure. For example, a run of a test scenario may indicate whether or not a certain transaction, involved in the running of the test scenario, produced an error message.

In one embodiment, identifying a run of a test scenario from data obtained from monitoring one or more users is done as part of the process of monitoring the users. For example, a user may be monitored for a session, which is a certain period of time that corresponds to running of a certain test scenario. Each session may start when the running of the certain test scenario starts (e.g., when a first screen is presented to a user), and may end when the running ends (e.g., after the user enters a last value involved in the test scenario). Thus, any data recorded during the session may be easily identified as belonging to a run of the certain test scenario.

In one embodiment, the action of monitoring a user and the action of identifying a run of a test scenario from data obtained from the monitoring are performed separately. For example, monitoring may generate bulk data corresponding to activity of one or more users. Identifying runs in the bulk data may require parsing the data to identify certain portions of interest, such as transactions executed by each of the users and/or inputs and outputs of each of the users. In one example, identifying runs involves detecting in the data obtained from monitoring signals that denote a start and/or end of a run. Optionally, the signals may be explicit, such as explicit tags in the data that denote a start of running a test and/or end of running a test scenario. Alternatively or additionally, the signals may be implicit. For example, a user entering data after not doing so for a while may signal a start of a run; while having a user stop entering data, and not entering further data for a prolonged period may signal an end of a run. In another example, the fact that a user performs a certain transaction may signal a start of a run, such as entering data in a screen labeled "begin new client record". Similarly, certain transactions may signal an end of a run, such as entering data in a screen labeled "finalize new client". In yet another example, identifying a run of a test scenario may involve selecting certain types of data and/or amounts of data that are to be included in the run. For example, while monitoring a user may involve collection of various types of data, in a certain system, runs of test scenarios may include only descriptions of screens presented to a user while interacting with the certain system. Thus, in this example, identifying runs may involve identifying and retaining descriptions of screens.

The process of identifying runs of test scenarios of a certain user may utilize, in some embodiments, data collected from other users. For example, determining boundaries of a test scenario, such as determining at what screen a run of the test scenario typically starts, and at what screen it ends, may be based on examination of data obtained from multiple users. In the examination of the data, certain common screens that appear in data from multiple users may be detected, and runs of test scenarios may be restricted to begin and/or end with a description of at least one of the common screens. Alternatively or additionally, identifying runs of test scenario run by a certain user, may involve examination of data obtained primarily from monitoring the certain user.

As described in some embodiments in this disclosure, identifying runs of test scenarios run by users on software systems may be performed by a test identifier. In some embodiments, the test identifier receives data from the monitoring module. Optionally, the test identifier and monitoring module are realized by the same software module and/or same hardware. In one example, one program may perform at least some of the operations involved in monitoring the users and identifying the runs. In another example, programs that perform at least some of the operations involved in monitoring the users and identifying the runs of test scenarios, run on the same servers.

In one embodiment, the monitoring module runs, at least in part, on hardware that is different from hardware on which at least some of the actions of the test identifier are performed. For example, a monitoring module that monitors users belonging to a certain organization may run, at least in part, on servers belonging to the certain organization. However, a test identifier, which receives data from the monitoring module, may run on remote servers belonging to, or controlled by, a different organization, such as an organization that provides analysis services to the certain organization.

Crowd Testing Data

Some aspects of this disclosure involve utilization of runs of test scenarios run by users belonging to, or associated with, different organizations. Optionally, a group of users running test scenarios may be referred to as a "crowd" or "crowd users". Optionally, crowd users do not run test scenarios in a coordinated effort, such as users belonging to different organizations that do cooperate to run test scenarios to test a certain software system that belongs to a certain organization, or users making a coordinated effort to test certain aspects of their software systems. Rather, as typically used in this disclosure, the users belonging to the different organizations run test scenarios to test software systems of their respective organizations, and do so essentially independently of each other.

In some embodiments, a first organization and second organization are considered different organizations if the first organization has a different ownership structure (e.g., a different composition of shareholders) than the second organization. Additionally or alternatively, two organizations may be considered different organizations if they have different employees, and/or different members of management.

In one embodiment, a user may be considered to belong to an organization and/or may be considered to be associated with the organization, if the user has a certain relationship with the organization such as being an employee of the organization, a member of the organization, and/or contracted to work for the organization. Additionally or alternatively, a user may belong to an organization, and/or be associated with the organization, if the worker performs work that is directly or indirectly done on behalf of the organization. For example, an employee of a first organization may be considered associated with a second organization if the employee runs, as part of her duties, tests that involve a system of the second organization. As used herein, the terms "associated" and "belongs" may be used interchangeably when referring to a user being associated with an organization or a user belonging to an organization.

Some aspects of this disclosure involve utilization of runs of test scenarios run on software systems belonging to different organizations and/or associated with the different organization. Optionally, a software system may be considered to belong to a certain organization and/or may be considered to be associated with a certain organization if the software system runs, at least in part, on hardware belonging to the organization and/or paid for by the organization (e.g., software running on cloud-based servers billed to the organization). Additionally or alternatively, a software system may be considered to belong to an organization and/or be associated with the organization if a user from the organization runs test scenarios, which run at least in part, on the software system. As used herein, the terms "associated" and "belongs" may be used interchangeably when referring to a software system being associated with an organization or a software system belonging to an organization.

Some embodiments in this disclosure involve monitoring multiple users belonging to different organizations. In some embodiments, each user belongs to a single organization. For example, 100 different users may belong to 30 different organizations; some organizations may have a single user that belongs to them, while other organizations have multiple users that belong to them. In some embodiments, users may belong to more than one organization. For example, 100 different users may belong to 150 different organizations; in this example, some of the users belong to more than one different organization.

In the embodiments, some of the systems on which test scenarios are run may be data-oriented large-scale software systems. Optionally, the software systems are packaged applications having multiple modules. Optionally the software systems may be considered similar to each other if the software systems use in a similar manner one or more modules of the same type (possibly having different versions). Additionally or alternatively, the software systems may be considered similar if they contain one or more modules with a similar function (e.g., modules that manage sales, stocking, or human resources).

In some embodiments, analyzing runs of test scenarios obtained from monitoring running of test scenarios by a crowd of users, on software systems of multiple organizations, may help gain certain insights that may not be easily attained from analysis obtained from runs associated with a single organization. For example, runs of test scenarios obtained from monitoring a crowd may help gain insight into the general applicability of certain test scenarios and/or test steps for testing certain components of the systems, such as modules, business process, and/or transactions. Based on the fact that multiple organizations run test scenarios to test certain components, it may be postulated that a different organization should also run similar test scenarios; this may be especially true if the different organization is in the same field of operations as the multiple organizations.

In some embodiments, analyzing runs of test scenarios obtained from monitoring running of test scenarios on systems of multiple organizations may also help gain insight into the commonality of certain aspects of the systems, as indicated by their reoccurrence in the runs. Such insight may be used, in some embodiments, to deduce whether a certain aspect is particular to a single organization, or a small number of organizations from the multiple organizations. Alternatively, it may be deduced, the certain aspect may be rather general and may be associated with a relatively large portion of the multiple organizations. For example, runs of test scenarios associated with multiple organizations may include a field which is given a value in each run of the test scenarios. If a certain value is entered in a large proportion of the runs (the same certain value is entered in each run of the large proportion or runs), then the value may be considered a default value or a general value. In this case, knowing the certain value may not assist much to identify a specific organization which is associated with a run from which the certain value was taken. However, if a certain value appears only in runs of a single organization, or in a small proportion of the runs, then the value may be considered a unique and/or proprietary value. In this case, knowing the certain value may assist to identify a specific organization which is associated with a run from which the certain value was taken. Thus, in some embodiments, monitoring runs of test scenarios associated with multiple organizations may help discover non organization-specific default values that can be used for running test scenarios of other organizations. Additionally, the same analysis may help identify what data in the runs may be considered proprietary.

Clustering Runs of Test Scenarios

In some embodiments, runs of test scenarios may be clustered. Clustering the runs may involve assigning a run of a test scenario to at most one cluster (e.g., "hard clustering" or partitioning). Alternatively, the clustering may involve assigning a run of a test scenario to one or more clusters. For example, the clustering may be "soft clustering" in which a run of a test scenario may belong to various clusters, possibly with different probabilities or levels of association to each cluster. Optionally, clusters of runs contain runs that are similar to each other.

In one embodiment, runs of test scenarios may be partitioned into clusters based on one or more values from the runs of test scenarios. For example, runs that involve a same start and/or end test step may be placed in the same cluster (e.g., runs that start from the same screen ID and end with an error are placed in the same cluster). In another example, runs that have a certain field (e.g., customer bank account number) are placed in the same cluster.

Clusters of runs of test scenarios may have different characteristics in different embodiments. In one embodiment, a cluster of runs of test scenarios should be of a size that reaches a predetermined threshold. Optionally, the predetermined threshold is greater than one. For example, each cluster should contain at least 3 runs. Optionally, the predetermined threshold is proportional to the number of runs being clustered. For example, each cluster may be required to contain at least 0.1% of the runs of test scenarios being clustered.

Clusters of runs may also be constrained according to the source of the runs belonging to the clusters. In one embodiment, a cluster of runs of test scenarios must include runs of at least a first predetermined number of different users and/or of users belonging to at least a second predetermined number of organizations. Optionally, the first predetermined number is greater than one and/or the second predetermined number is greater than one. In one example, the first predetermined number is 10, and the second predetermined number is 2; thus, each cluster includes at least 10 runs, and not all those runs are associated with the same organization. In another example, the first predetermined number is 5, and the second predetermined number is 5; thus, each cluster needs to contain runs associated with at least 5 organizations.

In one embodiment, ensuring that clusters of runs have certain characteristics, such as a certain size and/or include runs of a certain source, is done by a clustering algorithm that generates the clusters. For example, the clustering algorithm may ensure that each cluster includes runs of test scenarios of at least a predetermined number of users. Alternatively or additionally, ensuring that clusters of runs have certain characteristics may be done after clustering. For example, after clusters are generated, they may be filtered to remove clusters that have a size that is smaller than a predetermined threshold.

In one embodiment, clustering of runs of test scenarios may involve procedures that rely on some runs being similar based on a criterion of similarity. Optionally, a cluster of runs may include similar runs. Optionally, by similar runs it is meant that two runs are similar to each other according to the criterion. Optionally, by similar runs it is meant that at least a certain percentage of the runs belonging to a cluster are similar to each other according to the criterion. For example, a cluster may be considered to include similar runs if 90% of the pairs of runs in the cluster are similar according to the criterion. Optionally, by similar runs it is meant that runs belonging to the cluster are all similar to a representative of the cluster, such as one of the runs belonging to the cluster or an average run of the cluster (e.g., a centroid of the cluster).

The criterion according to which similarity between runs may be established, may have several forms. For example, the criterion for similarity between runs may be that similar runs include at least one of: essentially the same fields, similar combinations of fields, similar execution of transactions, similar user interactions, similar requests, similar test steps, and/or similar calls to procedures. Optionally, similarity between runs of test scenarios may be determined based on properties of their respective test scenarios of which the runs are instantiations; for example, by comparing the test steps used in each test scenario.

In one example, various runs of essentially the same test scenario (e.g., essentially the same testing script) are considered similar. In another example, runs of different test scenarios (e.g., using slightly different testing scripts), may be considered similar if certain similarity criteria are met (e.g., similar fields types or names, similar field values, similar screen content and/or layout, and/or similar return values in the runs). In yet another example, runs of test scenarios are considered similar, if the test scenarios from which they were instantiated are similar (e.g., involve similar screens, similar fields, and/or similar field values).

In one example, at least part of the runs of test scenarios involve software that runs on remote servers such as cloud-based servers. Monitoring a user running a test scenario may involve monitoring the content of the network traffic, such as information exchanged between an input and/or output device of the user and a cloud-based server. In this example, runs of test scenarios may be considered similar if the network traffic associated with them is similar (e.g., it follows a similar exchange sequence, and/or content of the network traffic is similar).

In one embodiment, clustering runs of test scenarios to clusters that include similar runs may be based on counting the number of similar fields used in corresponding screens that are included in the test scenarios; the larger the number of similar fields in the test scenarios, the more similar the runs of the test scenarios are considered to be. Optionally, fields may be considered similar if they include the same type of data. Additionally or alternatively, fields that have the same values are considered similar to each other. In one example, fields that include both the same type of data and the same values are considered more similar to each other than fields that have the same type of data (but different values).

In one embodiment, a type of data of a field is determined according to the context of the field in the screen. For example, if a field is preceded on a screen by the words "amount" or "sum due", the field is considered to be numerical; while if the field is preceded on a screen by the words "address" or "ship to", it is considered to be a string. Additionally or alternatively, the type of data of a field may be determined according to the features of the data structure representing the data. For example, if the field stores data in a variable that holds integers or floating-point values, the type of data is considered to be numerical. However, if the field stores data in an array, or vector of characters, the data type is considered to be a string. Additionally or alternatively, the type of data of a field may be determined according to meta data associated with a screen or database associated with the field. For example, a description of a column, in a database table which is to receive data from a field may be indicative of the type of data. In another example, meta data tags (e.g., XML tags) associated with a screen may indicate the type of data.

In another embodiment, clustering of runs of test scenarios to clusters that include similar runs of test scenarios may be based on similarity between orders of displaying similar fields in corresponding screens. The closer the order of presentation of similar fields in test scenarios, the more similar runs of the test scenarios are considered to be. In one example, test scenarios are represented, at least in part, as a sequence of field types, and/or fields IDs. The similarity between two runs of test scenarios may be determined to be inversely proportional to the number of editing steps that need to be taken to transform one sequence of identifiers to another ("edit distance"); the lower the edit distance between representations of two runs, the more similar they are considered to be (and so are their corresponding runs).

In yet another embodiment, clustering of runs of test scenarios to clusters that include similar runs may be based, at least is part, on similarity between executed procedures that are described in the runs. For example, the larger the overlap in the corresponding sets of procedures performed by each test scenario, the more similar runs of the test scenarios are considered to be. Optionally, the clustering may be further based on the order of the execution of the procedures; the closer the order of execution of procedures in different test scenarios, the more similar runs of the test scenarios are considered to be. In cases in which test scenarios involve execution of essentially the same procedures in essentially the same order, the similarity between runs of the test scenarios may be considered to be high.

In still another embodiment, the clustering of runs of test scenarios to clusters that include similar runs of test scenarios may be based on transactions described as executed in the runs of the test scenarios. For example, test scenarios may be characterized by the individual commands run by the system as part of the test scenario. Runs of test scenarios in which similar commands are executed may be considered similar for the purpose of clustering. Optionally, a cluster of runs that contains runs that have a certain proportion of common transactions executed in all runs in the cluster is considered a cluster of similar runs. For example, if at least 50% of the transactions involved in each run in a cluster appear in all other runs in the cluster, the cluster is considered to be a cluster of similar runs.

Logged activities related to running test scenarios may also be utilized for the purpose of clustering and/or determining similarity between runs of test scenarios. For example, clustering of runs of test scenarios to clusters that include similar runs may be based on one or more of the following logged activities: a list of users who ran the test scenarios, an analysis of access to a database, messages returned from the executed transactions (e.g., valid, warning, or error messages), fields which returned values in the transactions, and/or procedures utilized by the test scenario (e.g., as identified by logs of run time analysis). The clustering may be done according to there being similarity, involving one or more of the aforementioned logged activities, between test scenarios whose runs are assigned to the same cluster. Optionally, logged activities may be represented as feature values that may be put in a vector corresponding to a run. For example, if a certain activity is performed during a run, a vector corresponding to the run has 1 in a certain position, and otherwise there is a 0 in the certain position.

Similarity of runs of test scenarios may be determined, in some embodiments, according to the test scenarios and/or templates from which the runs were instantiated. Optionally, similarity of the test scenarios and/or templates may define similarity of the runs that were instantiated from the test scenarios and/or templates; thus, runs that were instantiated from similar test scenarios and/or templates are placed in the same clusters (e.g., by the clustering module performing the clustering of the runs). Alternatively, similarity of the test scenarios and/or templates may be used as features that assist in determining similarity of runs.

In one embodiment, runs that were instantiated from the same test scenarios and/or the same templates may be considered similar. Optionally, two test scenarios and/or two templates are considered the same if they involve execution of the same test steps, screens, and/or transactions. In one embodiment, two test steps are considered the same if they perform the same exact task and include the same exact associated data, while in another embodiment the two test steps are considered the same if they perform the same task but possibly involving different associated data. For example, a first test step that involves entering a new product that is a screwdriver (with details relevant to a screwdriver) may be considered in the latter embodiment as being the same as a second test step that involves entering a new product that is a hammer (with details relevant to a hammer); however, according to the former embodiment, the first and second test steps may not be the same. Similarly, screens that include field names and field values may be considered the same in one embodiment if the field names and the field values are the same; in another embodiment, the screens may be considered the same if the field names are the same. The same logic may also be applied to transactions; in some examples transactions may be considered the same if they are completely identical, while other transactions may be considered similar if they include some of the same and/or similar elements (e.g., the transactions involve similar screens).

In another embodiment, similarity of test scenarios and/or templates is determined by comparing and/or counting similar elements in the test scenarios and/or templates. If the number and/or proportion of the similar elements reaches a predetermined threshold, then runs instantiated from the test scenarios and/or templates may be considered similar and placed by clustering in the same cluster of runs. For example, if more than 50% of the screens included in two templates are similar, then runs instantiated from the two templates may be placed by clustering in the same cluster.

In yet another embodiment, test scenarios and/or templates from which runs were instantiated may be utilized to generate feature values, which are used to determine similarity of the runs to each other. For example, a vector of features representing a run may include values extracted from a template and/or test scenario from which the run was instantiated.

Clustering of runs of test scenarios to clusters of similar runs may be based on data associated with the runs. Such data may include data describing conditions under which a run was executed. For example, the data may describe aspects of the system (e.g., data involving modules, hardware, and/or software versions). In another example, such data may pertain to a test runner, such as the role (or assumed role) of the tester in an organization, level of skill of the tester, and/or permissions granted to the tester.

In some embodiments, clustering of runs of test scenarios to clusters of similar runs is done, at least in part, according to descriptions related to the systems on which the test scenarios were run. For example, such descriptions may include configuration elements (e.g., configuration files, customization code and/or setup files). Additionally or alternatively, the descriptions may include configuration changes (e.g., addition, deletion, and/or modifications) to the configuration elements. Thus, for example, runs of test scenarios concerning modules with similar configuration files (e.g., the customization files indicate similar default procedures and/or database accesses) may be placed in the same cluster. In another example, runs of test scenarios executed as a response to similar configuration changes (e.g., as determined by the original and/or changed values involved in the configuration changes), may be placed in the same cluster based on their similar configuration changes.

In some embodiments, runs of test scenarios may be represented as vectors of features that may be converted to numerical values. For example, certain dimensions in the feature vectors may correspond to the presence or absence of certain fields, procedures, test steps, and/or transactions in a test scenario (e.g., a value of '1' is given to a feature if a field has a certain value in the test scenario, and '0' otherwise. Alternatively, a value of '1' is given to a certain feature if a certain procedure is called in the test scenario, and '0' otherwise). In another example, certain dimension in the feature vectors contain values of a certain field from a run (e.g., time, data, or price), or are derived from processing one or more field values (e.g., averaging the delivery time from multiple entries of individual delivery times entered in a screen). In yet another example, certain values in a feature vector are assigned numerical values according to categories to which values from the runs belong. For example, a sale may be categorized as "domestic" or "foreign", and accordingly be given a value of "1" or "2" in the feature vector.

Feature vector representations may be utilized in order to compute a degree of similarity between feature vectors of runs of test scenarios. For example, in cases where the feature vectors contain numerical values (or can be converted to numerical values), the distance similarity between vectors representing test scenarios may be computed using one or more of the following established distance metrics: Euclidean distance of various norms, vector dot product, cosine of angle between vectors, Manhattan distance, Mahalanobis distance, Pearson correlation, and Kullback-Leibler divergence.

In one embodiment, a cluster of similar runs includes runs that are represented by similar vectors. Optionally, similar vectors may be characterized in various ways. In one example, similar vectors are vectors whose average pairwise similarity is above a predetermined threshold (e.g., the threshold may be 0.5). Optionally, the average pairwise similarity is determined by computing the average of the dot product of each pair of vectors. In another example, similar vectors are vectors that are all similar to a certain representative vector; e.g., the vectors all within a sphere of a certain Euclidean distance from the representative.

Those skilled in the art may recognize that various clustering algorithms and/or approaches may be used to cluster runs of test scenarios into clusters that include similar runs of test scenarios. For example, the clustering may be done using hierarchical clustering approaches (e.g., bottom-up or top-down approaches) or using partition-based approached (e.g., k-mean algorithms). In addition, some of the test scenarios may have assigned clusters while others may not. In such a case, a semi-supervised clustering approach may be used such as an Expectation-Maximization (EM) algorithm.

In one embodiment, the clustering of the runs of test scenarios to clusters that include similar runs may be done utilizing a classifier that is trained to assign test scenarios to predetermined classes. Optionally, the classifier is trained on labeled training data that includes training data that includes representations of runs of test scenarios (e.g., feature vectors) and labels corresponding to clusters to which the runs are assigned. If the labels in the training data are assigned according to some (possibly arbitrary) notion of similarity between test scenarios, clusters of test scenarios that have the same label assigned by the classifier are likely to contain runs that are similar according to the notion of similarity.

Optionally, runs of test scenarios are labeled according to the module they involve (e.g., "sales", "human resources", "manufacturing"), the type of activities involved in the scenario (e.g., "accessing database", "data entering", "report generating"), fields in the test scenario (e.g., "customer ID", "part number"), properties of the test scenario (e.g., "fast", "many steps", "expensive", "includes private data"), and/or results of a run of the test scenario (e.g., "ok", "error", "access denied—permissions"). Optionally, labels may be constructed from multiple attributes. For example, a run of a test scenario may be labeled as "involve sales, no private data, access corporate database".

Optionally, labels assigned to runs of test scenarios may be generated and/or assigned manually (e.g., by a tester running a test), and/or automatically, e.g., by a procedure that analyzes a test scenario to detect attributes describing it (e.g., what modules and/or procedures it involves).

Those skilled in the art may recognize that there are many algorithms, and/or machine learning-based approaches, that may be used to train a classifier of runs of test scenarios using labeled training data. For example, some examples of the algorithms that may be used include logistic regression, decision trees, support vector machines, and neural network classifiers.

In some embodiments, clusters of runs of test scenarios may be assigned a cohesion rank that describes how close to each other are runs belonging to the cluster. A cohesion rank of a cluster may describe various aspects related to the closeness of runs of test scenarios belonging to a cluster. In one example, similarity of runs of test scenarios is related to the fields included in the screens of the test scenarios; some of the fields may be common to the screens involved in runs belonging to the cluster, and some may not. The cohesion rank may be proportional to the number of fields that are common in the runs belonging to the cluster (e.g., they belong to at least 50% of the runs in the cluster). The cohesion rank can be between two runs of test scenarios or between groups of runs of test scenarios. Optionally, the cohesion rank may be expressed via cluster metrics such as average distance from the cluster centroid or the ratio between the average radius of a cluster (intra-cluster distance) and the average distance between clusters (inter-cluster distance).

Clusters generated in the embodiments (e.g., clusters of runs of similar test scenarios) may be filtered in various ways. Optionally, the filtering may be done in order to reduce the number of clusters that need to be considered and/or retain clusters with a certain desirable property. Optionally, a test scenario template generated from a filtered cluster and/or representing a filtered cluster is not suggested to a user. Alternatively or additionally, a filtered cluster is not utilized for generating a test scenario template and/or does not have a test scenario template to represent it. Optionally, clusters are filtered according to their size. For example, clusters of runs of test scenarios that contain less than a predetermined number of runs are filtered. Optionally, clusters are filtered according to the number of their associations. For example, runs of test scenarios in a cluster may be associated with certain organizations (e.g., each run may be associated with an organization). Clusters containing runs that are associated with too few different organizations may be considered too homogenous and filtered.

Test Scenario Templates

A test scenario template may include various test steps that need to be performed by a user in order to test certain aspects of a system being tested. Optionally, in some embodiments, a test scenario template may be lacking one or more values that need to be provided in order to run a test scenario based on the test scenario template. In such a case, a user running a test scenario based on the template may be required to enter the one or more values that need to be provided, in order to complete the template of the test scenario; alternatively, the one or more values and be calculated and/or guessed. In one example, a test scenario template may describe a test scenario in which an order process is completed; the template may be lacking a customer name and product ID, and in order to run an instantiation of the template, a user may be required to enter the lacking details. In another example, a template may be of a test scenario in which rush shipping is performed; a screen presented to the user may already have the rush shipping box checked, but the user may still need to add details such the client account number and shipping address.

In one embodiment, a template may include certain values from which a user may be required to choose in order to run a test scenario instantiated from the template. For example, a template may have various values for a discount (e.g., 10%, 20%, or 50%); a user needs to choose from in order to complete a transaction that is part of the template. Optionally, the values the user may need to choose from are derived from one or more runs of test scenarios that were used to generate the template. For example, the aforementioned values of the discount are the most popular values found to be used in runs of test scenarios from which the template was generated.

In some embodiments, one or more runs of test scenarios may be used in order to generate a test scenario template to represent them. Optionally, the test scenario template is generated by a template generator module. In one example, the runs of test scenarios may belong to a cluster. Optionally, the test scenario template may identify, for its corresponding cluster, one or more transactions used by test scenarios belonging to the cluster. Additionally or alternatively, the test scenario template may identify a way of using transactions that are part of the test scenarios whose runs belong to the cluster. For example, a template may define the order of programs that are to be called, the type of actions that are to be taken by a user (e.g., what fields to fill, what buttons to push), and/or provide default values to at least some of the fields (e.g., enter default values to some fields that appear on screens that are part of test scenarios generated from the template). Additionally or alternatively, a test scenario template may identify one or more possible values that may be used to run a transaction identified by the template.

It is to be noted that phrases such as "identifies a transaction" involves any type of transaction identification, such as a transaction identification number, a name of a transaction, a description of a transaction, a screenshot of a transaction, computer code of a transaction, and/or any other method that enables a human and/or a computer to link between a possible value and a transaction. Additionally, identifying a transaction may involve noting a transaction identification. In one example, noting a transaction identification involves storing the transaction identification; for example, a template may store transaction identification numbers that are to be executed when running an instantiation of the template. In another example, noting a transaction identification involves providing the transaction identification. For example, upon a query, scanning a template may generate and/or transmit names of transactions that are stored in it.

Generating the template may involve utilizing information from a plurality of runs of test scenarios. For example, one or more test steps, commands, and/or values may be copied from at least one of the plurality of runs of the test scenarios and placed in the template. Additionally or alternatively, information contained in at least some of the plurality of runs may be analyzed in order to determine certain test steps, commands, and/or values are to be used in the template. Note that not all information in the plurality of run of the test scenario needs to be utilized to generate the test scenario template. For example, a test scenario template may include a proper subset of test steps included in certain runs. In another example, certain runs, such as certain runs in a cluster, may be disregarded when generating a template based on other runs in the same cluster.

In some embodiments, template generation may be based on information obtained from one or more test scenarios. Optionally, instantiations of the one or more test scenarios are runs of test scenarios obtained and/or identified from activity data of users. In one example, a test scenario may include a script comprising test steps, and one or more test steps from the script are included in the template. Note that the script may be one various types of media; for example, a hard copy document (e.g., paper), an electronic document (e.g., a Microsoft Word™ or a PDF document), and/or a list of computer commands (e.g., a script for an automatically run test scenario). In another example, a test scenario may include certain values that may be altered by a user running instantiations of the test scenario (e.g., the certain values may be default values). In this example, to generate the template it may be desirable to utilize a certain value from a test scenario, rather than a user-provided value from a run that is an instantiation of the test scenario.

A test scenario template may be generated based on data coming from several sources. In one embodiment, a template is based on automatic test scenarios (e.g., scripts run automatically by a program without any essential human intervention). Additionally, the template may also be based on the runs of the same test scenario. Thus, certain values in the template may come from the test scenarios, while other values may come from the runs. In another example, a template may be based on runs coming from different organizations. The template may contain certain screens coming from a first organization (e.g., as they appeared in runs associated with the first organization), while other screens in the template may come from runs associated with a second organization.

In one embodiment, a test scenario template is generated from a first run of a test scenario run by a first user and a second run of a test scenario run by a second user belonging to a second organization. Optionally, the first and second runs were obtained from monitoring of the first and second users, respectively. Additionally, the first organization may be different from the second organization and the first user is not the second user. The test scenario template generated from the first and second run identifies a transaction used in the first and second runs and one or more possible values for running the transaction. Optionally, additional runs of test scenarios, besides the first and second runs, are used to generate the test scenario template.

In one embodiment, at least one of the possible values for running a transaction in a template generated from first and second runs may be derived from values obtained from the first and/or second runs. Optionally, the at least one of the possible values for running the transaction does not appear in each of the first and second runs. For example, the at least one of the possible values is an average of a first value from the first run, and a second value form the second run, and the first value does not equal the second value. Optionally, the test scenario template includes a combination of the possible values that may be used to run the test scenario template, and the combination does not appear in any of the first and second runs. For example, a combination of possible values involves fields $f_1$ and $f_2$; the first run has values $v_1$ and $u_1$ for the fields $f_1$ and $f_2$, respectively, and the second run has values $v_2$ and $u_2$ for the fields $f_1$ and $f_2$, respectively. In addition, $v_1$ does not equal $v_2$ and $u_1$ does not equal $u_2$. In this example, if the test scenario template has a value $v_1$ for $f_1$ and $u_2$ for $f_2$, then it contains a combination of possible values that does not appear in any of the first and second runs.

In one embodiment, the first and second runs upon which a template is based, may each be manual, semi-automatic, or automatic runs of test scenarios. In one example, a test scenario template is generated from a first run of a first test scenario which is a manual test scenario and a second run of a second test scenario which is an automatic test scenario. In another example, a test scenario template is generated from a first run of a first test scenario and a second run of a second test scenario, and both the first and second runs are automatic.

In another embodiment, the first test scenario and second test scenario are the same test scenario. Thus, the first run and the second run are instantiations of the same test scenario. In this case, despite being runs of the same test scenario, the first and second runs may be different (e.g., due to different inputs provided by a user during their running). Alternatively, the first test scenario and second test scenario may be different test scenarios. Thus, the first run and the second run are runs of different test scenarios; however, the first and second runs may be similar due to similarities (despite being different) between the first and second test scenarios and/or similarities in inputs provided by the user while running the first and second runs).

In one embodiment, generating a test scenario template involves receiving multiple runs (e.g., runs belonging to a cluster of similar runs), and selecting at least a first run and a second run, from among the multiple runs, upon which the template is to be based. Optionally, the first and second runs are selected such that they belong are runs of different users and/or runs of users belonging to different organizations. Optionally, the first and second runs are runs that exhibit, on average a high similarity to the multiple runs (e.g., they are similar to a cluster centroid). Optionally, the first and second runs are selected such that other of multiple runs have a similarity to either the first run or the second run that reaches a predetermined threshold. Optionally, the first and second runs are selected according to a profile, such as a profile of a certain user. Optionally, the profile indicates transactions and/or values typically utilized by the certain user, and the first and second runs that are selected involve transactions and/or values that appear in the profile.

In one embodiment, generating a test scenario template from a cluster of runs of test scenarios involves identifying a representative run of a test scenario for the cluster, and using the representative run of a test scenario as basis for the at least one template.

In one embodiment, generating a test scenario template from a run of a test scenario may involve utilizing information from the run of the test scenario. For example, one or more test steps, commands, and/or values may be copied from the run and placed in the template. Additionally or alternatively, information contained in the run may be analyzed in order to determine certain test steps, commands, and/or values are to be used in the template. Note that not all information in the run of the test scenario needs to be utilized to generate the test scenario template. For example, the template may include a proper subset of test steps included in the run of the test scenario. Optionally, certain information in the run which may be deemed proprietary is not utilized for the template. Additionally or alternatively, certain information in the run which may be deemed proprietary is removed from the template.

In another embodiment, generating a test scenario template from runs of test scenarios (e.g., the runs belong to a cluster of similar runs of test scenarios), may involve utilizing values of a field, as they appear in runs, in order to set the value of the field in the test scenario template.

In one embodiment, the value for the field in the test scenario template is selected from the values of the field in the runs of test scenarios in the cluster. For example, the value of the field in the template is set according to the value of the field in a randomly selected run of a test scenario from the cluster.

In one embodiment, the value for the field in the test scenario template is generated by a function with one or more parameters that are set according to the values of the field in the runs of test scenarios in the cluster. Optionally, the value generated by the function is not a value found in any of the runs belonging to the cluster. For example, in order to fill the field "age" in the template, a distribution of the values of "age" in runs in the cluster may be learned, and then the value in the template may be set according to the expectation of the learned distribution or randomly drawn according to the distribution. In this example, the resulting value of "age" may not be an actual value that appears in any of the runs belonging to the cluster.

Test scenario templates may be suggested to a user so that the user may run an instantiation of the templates on a system to which the user belongs and/or is associated with. Optionally, a template may be generated from one or more runs of test scenarios associated with various organizations to which the user does not belong.

In some embodiments, a user is suggested to run a test scenario template by presenting the user with a suggestion on a user interface. For example, the user interface may be a screen (e.g., monitor, image projected on a screen, and/or augmented/virtual reality display). In another example, the user interface may involve a speaker. Optionally, the user may interact with a system via the user interface in various ways; for example, touch (e.g., via a touch screen), typing (e.g., on a physical and/or virtual keyboard), a hand-operated control device (e.g., a mouse), and/or voice commands. Optionally, the user is given an opportunity to modify via the user interface, data related to the instantiation and presented on the user interface; for example, the user may modify default values, set according to the template, and presented on a screen that is presenting while running an instantiation of the template. Optionally, the user interface may initiate an instantiation of a test scenario template; for example, the user interface may present a first screen of the test scenario template and prompt the user to take a certain action to advance execution of the template.

In one embodiment, a user is recorded while running a certain test scenario. If it is identified that the certain test scenario is similar to a test scenario template (e.g., the certain test scenario involves similar test steps, transactions, and/or values as those involved in the template), it may be suggested to the user to run an instantiation of the test scenario template. Optionally, a suggestion to the user to run an instantiation of the template is made via a user interface.

In another embodiment, a profile of a user is utilized to suggest to the user to run a test scenario template appropriate to the user based on information included in the profile. In one example, the profile may include various information regarding the user and/or an organization to which the user belongs, such as information regarding modules, business processes, and/or transaction utilized by the user and/or organization. In another example, the profile may include runs of the user and/or users belonging to a certain organization, and/or data derived from the runs. In addition to the profile, and/or instead of it, the suggestion of a template to the user may be done according to other factors such as coverage of templates, importance of templates, ranking of templates, and/or connectivity factors of templates, as described in more detail below.

Coverage

In order to validate that certain system elements operate correctly after installation, customization, a change, and/or an upgrade is done to the system—it is often the case that many test scenarios need to be run. In order to validate the system's performance, it is desirable that the test scenarios that are run should cover many elements that may be related to, and/or affected by, the installation, customization, change, and/or upgrade. For example, the elements may include various transactions that may exhibit undesired behavior due to the certain configuration change and/or upgrade; each executed test scenario may be able to be used to test a subset of the transactions that are likely to be affected by the change, and/or update, in order to determine if unwanted system behavior occurs that involves one or more transactions. Therefore, the coverage offered by a set of test scenarios (or test scenario templates), such as which modules, business processes, and/or transactions are evaluated by running a set of test scenarios, becomes an important consideration when selecting which test scenarios to run. Ideally, it would be desirable to obtain as large coverage as possible with test scenarios, however, often restrictions stemming from limited resources for running test scenarios have also to be taken into account.

In one embodiment, coverage refers to a percent of business processes, used by an organization, that are sufficiently tested by test scenarios in relation to the total number of business processes used by an organization or a certain user. For example, if 40% of the business processes run by users of an organization are sufficiently tested by certain test scenarios, then the coverage of the certain test scenarios is 40%. In some cases in order for a module, business process, and/or transaction to be sufficiently tested, more than one aspect of the module, business process, and/or organization needs to be tested. This may involve running multiple tests in order to cover the more than one aspect. For example, different combinations of input data for the same screen need to be provided in order to test various aspects of a certain business process.

In one embodiment, a required coverage for a certain user that runs test scenarios, is received and utilized for suggesting test scenario templates for the user. For example, the required coverage may list certain transactions that need to be evaluated with test scenarios run by the user, and optionally the number of test scenarios that need to be run to evaluate at least some of the transactions. Alternatively or additionally, the required coverage may indicate what percentage of a system's transactions need to be evaluated by the test scenarios. In another example, the required coverage may indicate which business processes, screens, and/or specific fields need to be evaluated by running test scenario.

In one embodiment, achieving a required coverage is done by evaluating a large number of test scenario templates and estimating coverage achieved by individual templates and/or subsets of templates. Following the evaluation, a subset of templates that includes at least one template is suggested to the user in order to achieve the required coverage. Optionally, the suggested subset that includes at least one template is a subset with an essentially minimal number of templates and/or involves performing an essentially minimal number of test steps. It is to be noted that by an "essentially minimal" number it is meant a number close to the absolute minimal possible, for example up to 10% more than the absolute minimum. In some cases, the absolute minimal number of templates may be determined by an exhaustive evaluation of all possible subsets of templates; however, this may prove intractable if a large number of templates are involved.

In one embodiment, calculating the required coverage for a certain user is based on a usage information of a certain user. For example, by analyzing the usage information a list may be prepared of certain modules, business processes, and/or transactions the user frequently utilizes. This list can then be used to guide a search for a certain subset of test scenario templates that tests aspects of items on the list which need to be tested.

Finding a minimal sized subset of template obtaining a desired coverage need not require exhaustive search in every case. Those skilled in the art may recognize that there are structured methods for evaluating a search space of subsets of templates such as branch-and-bound approaches, or A* searches that enable finding the essentially minimal subset without necessarily evaluating all subsets of templates. In addition heuristic search methods may be used, such as simulated annealing, genetic algorithms, and/or random walks in order to quickly find subsets with a small number of templates (but not necessarily minimal). Additionally, optimization algorithms that involve constraint satisfaction may be used to efficiently find an essentially minimal subset.

In one embodiment, a goal of a search for a subset of templates that achieves a certain coverage is to find a subset of templates, which involves a minimal amount of testing time on the user's part. Achieving the required coverage for the certain user involving the shortest testing time for the user may be done by estimating time to achieve a required coverage for the certain user by many templates (e.g., in a search performed in the space of possible subsets of templates). And after evaluating the time it takes to run each of the many templates and/or subsets of templates, suggesting the certain use utilize a subset that includes at least one of the templates, that both achieves the required coverage and requires an essentially minimal time to complete. In this case, the suggested templates are likely to be templates relevant to scenarios that are expected to be used by the certain user, and are likely to be spread to approximately achieve a uniform coverage of the scenarios with the suggested templates.

In some cases, it is useful to refer to a coverage of a test scenario template with respect to a test scenario. In one embodiment, a template is said to cover a certain test scenario if it involves essentially the same test steps as the test scenario. Additionally or alternatively, coverage of a template with respects to a test scenario may be the percentage of test steps of the test scenario that are included in the template. Similarly coverage of a subset of templates with respect to a test scenario may refer to the test steps in the test scenario that are included in at least one of the templates in the subset.

Importance of a test scenario for a certain user may also be an objective that guides the suggestion of a template to the certain user. In one embodiment, test scenario templates that cover a test scenario are estimated to be important are suggested to the certain user before other templates that are estimated to be less important.

There are various ways in which importance of a test scenario may be evaluated. In one example, the importance of a certain test scenario is determined by frequency in which the certain test scenario is used relative to frequency in which other test scenarios are used. Thus, a test scenario often run by the certain user may be deemed significantly more important than a test scenario rarely run by the certain user. In another example, importance of a certain test scenario is determined by characteristics of users that run the certain test scenario, compared to characteristics of users that run other test scenarios. For instance, if a certain test scenario is run primarily by users that hold high positions in an organization's hierarchy, it is likely that the certain test scenario is more important than another test scenario that is used primarily by users on the lower rungs of the organization's hierarchy. In yet another example, importance of a certain test scenario is determined by a financial value associated with the certain test scenario compared to a financial value associated with other test scenarios. For example, a test scenario that involves retaining an unsatisfied customer may be given a high financial value for the organization compared to another transaction which involves sending customers a notice that their order is still pending.

Profile of a User

A profile of a user may include data related to the user, an organization to which the user belongs, and/or activity of the user on a software systems, such as software systems associated with the organization. Optionally, at least some of the data in a profile may be considered proprietary data. Optionally, the proprietary data may identify details regarding the user and/or an organization related to the profile, such as an organization to which the user belongs. In one example, a profile may include proprietary data about the user (e.g., age, address, languages, skills), and/or proprietary data related to a role of the user in the organization (e.g., job title, placement of user in organizational chart, and/or permissions and/or privileges of the user). In another example, the profile may include proprietary data related to the organization to which the user belongs (e.g., field of operation, name and sizes of departments, products and/or services provided by the organization, permissions and/or accounts of the organization, and/or customers and/or suppliers of the organization). In yet another example, proprietary data included in a profile of a user may be indicative of activity of the user. In this example, the activity may have been previously observed and/or recorded (e.g., by monitoring of the user). Additionally or alternatively, the activity may be predicted based on characteristics of an organization to which the user belongs, the position the user holds in the organization, and/or other attributes of the user (e.g., permissions and/or accounts of the user).

In one embodiment, a profile of a user includes data that is indicative of test scenarios relevant to the user and/or templates of test scenarios relevant to the user. For example, the profile may include attributes such as modules used by the user, transactions used by the user (e.g., identifiers of transactions and the number of times they were executed), and/or characteristics derived from activity of the user (e.g., accesses to databases, quantities of network data generated, reports generated by the user). Optionally, a profile of a user may include runs of test scenarios of the user, and/or results of a summary and/or analysis of runs of test scenarios of the user. For example, the profile may include a list of the transactions that are executed often in runs of test scenarios of the user. Optionally, a profile of a user may include information indicative of test scenario templates utilized by a user (e.g., templates which the user ran instantiations of).

A profile of a user may be used in order to suggest to the user to utilize a certain test scenario template. Optionally, the template may be selected from among one or more test scenario templates generated from clusters of runs of test scenarios. For example, given a profile that indicates that a user performs many transactions involving database updates, the system may recommend for the user a template generated from a cluster that contains runs of test scenarios that involve database updates. In another example, if the profile of a user contains samples of runs of test scenario run by the user, the system may suggest to the user to use a template generated from a cluster that contains test scenarios that are similar to a test scenario from which a run in the profile was instantiated. In yet another example, a profile includes state information regarding an organization to which a user belongs, such as the time zone and location of a certain site. This information may be used to suggest a certain template for a user testing a software system at the site. For example, a template that involves a report of a vacation of a user in advance may be relevant to an organization site located in France, but not for a site in the US (where such a practice may not be typically required).

In one embodiment, a profile of a user includes permissions of a user. For example, if a profile indicates that a user has permission to approve vacations, the user may be suggested to run a test scenario instantiated from a template that includes such a task. However, if the user does not have such a permission, then the certain template is irrelevant for the user. In another example, a profile describes a position of the user in the organization hierarchy. In this example, a first user may belong to the marketing department, and thus has permission to enter a new potential client in to the system. A second user may belong to the sales department, and thus can send an offer to a client. Thus, based on the profiles of the users, the system may suggest relevant templates for the users: to the first user a template that involves entering client data, and to the second user a template that involves making an offer to a client, and not vice versa.

In some embodiments, a profile may belong to an organization. For example, it may describe a generic user belonging to the organization. Optionally, a profile of an organization may be utilized to perform initial filtering of test scenario templates for users belonging to the organization. For example, according to a profile of an organization, the organization may not be authorized to run a test scenario instantiated from a certain template (e.g., due to lack of permission). This may make the template irrelevant for each and every user belonging to the organization. However, if the organization is authorized to run an instantiation of the test scenario template, according to the profile of the organization, then a profile of an individual user belonging to the organization may need to be checked in order to determine if the template is relevant to the individual user (e.g., to check whether the user has permission to run a test scenario instantiated from the template). In another example, a profile may indicate a method in which the organization conducts business. For instance, the profile may indicate a policy of making payments for goods. Thus, if the profile indicates that the organization always pays after receiving goods, a template that describes advanced payment for goods is not relevant for any user in that organization.

In one embodiment, a profile of a user may include usage data of an organization to which a user belongs. For example, the profile may describe which modules are relevant to organization. Based on the profile, a user will be suggested templates that are relevant to the organization. Similarly, the profile may describe actions that users belonging to the organization may have permission to perform. For example, if users of an organization are not authorized to access a certain database, a user belonging to the organization will not be provided with a template that includes an access to the certain database.

In some embodiments, a profile of a user and/or an organization may represent usage of transactions by the user and/or users belonging to the organization. Optionally, a profile that represents usage of transactions may be represented in various ways. The profile may include a list of runs of test scenarios, clusters of runs, and/or transactions utilized by the user. Optionally, the usage data may be represented as a vector in which each dimension may correspond to a certain transaction, cluster of runs, and/or template. In one example, if a user utilized a transaction, a value of the vector in a corresponding dimension is 1, otherwise it is 0. In another example, a value of a dimension in the vector that corresponds to a certain cluster of runs is set according to the number of runs in the cluster that were run by the user. Thus, the more the user used transactions with corresponding runs in the certain cluster, the higher the corresponding value in the vector.

Having a vector representation for at least some of the values in a profile makes it easier, in some embodiments, to compare between profiles (e.g., to find similar vectors representing similar profiles of users). Additionally, vector representation of profiles may make it easier to perform mathematical operations, such as vector dot-product or matrix factorization.

A profile of a user may be utilized to customize a test scenario template for the user. For example, by filtering the test scenario template in order for it to be more appropriate for the user. In one embodiment, a profile of the user may be used to determine which test steps, from among the test steps described in a test scenario template, are relevant for the user, and optionally remove test steps that are irrelevant. For example, a profile of the user may indicate that the user does not confirm shipments. A test scenario template, suggested to the user may include several test steps that culminate with a test step involving confirming shipment. In such a case, the last test step may be removed in order to make the test scenario template more appropriate for the user. In one example, a template may include values related to international shipping; however, if the profile of the user indicates that the user runs transactions that only involve domestic shipping, certain values concerning international aspects of the transactions may be removed from the template (e.g., destination country, currency conversion rates). In another example, a template that includes a transaction that is part of an employee evaluation process may include values related managerial assessment of the employee. If the profile of the user indicates that the user is not a manager, then those details may be irrelevant for the user. In this case, the user may receive a template that only includes transactions in which self assessment of the employee are performed. In another embodiment, a profile of the user may be used to determine which values utilized in a test scenario template may be appropriate for the user. Optionally, values deemed irrelevant to the user may be removed from the test scenario template suggested to the user. Optionally, the user may be requested to provide relevant values instead of the removed irrelevant values. For example, a profile of a user may indicate that the user deals exclusively with domestic customers having domestic addresses. However, a test scenario template may include default values that correspond to foreign addresses. In such a case, the foreign addresses may be removed, and the user may be requested to provide examples of domestic addresses.

Cleaning Proprietary Data

In one embodiment, a test scenario template generated from one or more runs of test scenarios does not include proprietary data captured during the stage of monitoring users that ran the test scenarios. Optionally, the one or more runs of test scenarios belong to a cluster and the test scenario template is generated as a representative of the cluster.

In one embodiment, determination of whether certain data, which appears in a run of a test scenario and/or is obtained from processing data from the run, is proprietary data is based on the repetitiveness of the data in runs of test scenarios. For example, if a certain value appears in only a small proportion of the runs, in runs of a small number of users, and/or runs associated with a small number of organizations, the certain value may be considered proprietary. Conversely, if a certain value is the same in many runs, or in runs of at least a certain proportion and/or number of the users, and/or is associated with at least a certain proportion and/or number of organizations, that value may be considered to be non-proprietary. Optionally, a predetermined proportion is used as a threshold to determine if a certain value is proprietary or not. For example, if a number of different users which ran runs of test scenarios that included the certain value is less than the predetermined threshold, the value is considered proprietary for those users who had runs that included the value. Otherwise, it may be considered non-proprietary (since many users had the value in one of their runs). It is to be noted, that "predetermined" refers to both a fixed value known a priori (e.g., a threshold of 10 users) and/or a value derived from known logic (e.g., 10% of the users).

In one embodiment, data for which one or more of the following is true may be considered proprietary data associated with an organization and/or proprietary data belonging to the organization: the data describes an aspect of the organization and/or a user belonging to the organization; the data appears in a database of the organization; the data appears in a run of a test scenario associated with the organization and/or is derived from the run; and/or the data is generated by a software system associated with the organization. For example, any data on a server belonging to an organization may be considered proprietary data associated with the organization. In another example, any data derived from analysis of runs of test scenarios associated with an organization may be considered proprietary data of the organization. Additionally or alternatively, data for which one or more of the following is true may be considered proprietary data of user and/or proprietary data belonging to the user: the data describes an aspect of a user; the data describes an organization to which the user belongs; the data appears in a database of the user; and/or the data appears in a run of a test scenario run by the user.

It is to be noted that as used herein, a phrase like "proprietary data" may refer to proprietary data of an organization and/or proprietary data of a user. Additionally, phrases like "proprietary values" and "proprietary data" may be used interchangeably in this disclosure.

In one example, proprietary values are removed from a test scenario template generated from a certain cluster (i.e., one or more runs belonging to the certain cluster were utilized to generate the template). Optionally, the proprietary values are removed by a data cleaner module that operates on the generated template. Additionally or alternatively, removal of proprietary data may be done by other modules belonging to the system, such as a template generator, a customization module, a ranking module, and/or a user interface. Optionally, removing the proprietary values involves selecting a value from the template, and removing the selected value from the template if the selected value appears in less than a first predetermined number of runs of test scenarios in the certain cluster. Additionally or alternatively, the selected value may be removed if it appears in runs belonging to the certain cluster that are associated with less than a second predetermined number of different organizations. In this example, both the first predetermined number and the second predetermined number are greater than one. Optionally, the first predetermined number and/or the second predetermined number are proportional to the number of user with runs belonging to the certain cluster and/or the number of organizations associated with runs belonging to the certain cluster. For example, the first predetermined number may be set to be the maximum of two and 10% of the users with runs in the certain cluster.

Determining whether data is proprietary may utilize a profile of a user and/or a profile of an organization. For example, any data that appears in a profile of a user and/or an organization may be considered proprietary and thus not allowed to be included in a template. In another embodiment, the profile may indicate certain data is proprietary (e.g., by placing it a an exclusion list which prohibits utilization of the data in templates).

In one embodiment, testing whether certain data is proprietary is done by querying a database (e.g., a database that contains samples of proprietary data). Additionally or alternatively, the certain data may be submitted to a procedure that evaluates the data to determine whether the data is likely to be proprietary. For example, the procedure may perform semantic and/or syntactic analysis of the data to check whether the certain data has a certain meaning and/or contains certain patterns that indicate that it is likely to be proprietary. For example, the procedure may scan the certain data for strings like "bank account", "address", and/or "social security number".

In another embodiment, a user may provide feedback on certain data which indicates whether the certain data is proprietary. For example, the user may review values of data fields prior to running a test scenario and indicate which values the user considers proprietary. Additionally or alternatively, while a test scenario is running, the user may mark certain data as proprietary (e.g., data the user considers should not be seen by the user or other users). Optionally, the user may provide feedback the certain data via a user interface on which the user is running the test scenario.

In yet another embodiment, determining whether a certain value may be proprietary may be assisted by noting the source, location, and/or data structure that contains the certain value. For example, in certain systems, a value that appears in a checkbox on a screen is likely to be a default value of the system, and thus not likely to be proprietary. However, free text fields on screens are more likely to contain data entered by a user, and are thus likely to be proprietary. In a another example, in which the certain value appears in a drop-down menu in a screen, it might be necessary to determine from the context whether values in the drop-down menu are proprietary or not. Additionally, certain systems may be built in such a way that makes it relatively easy to determine which data is proprietary and which is not. For example, in SAP ERP meta data, which typically includes general (non-proprietary) data, is clearly marked.

In one embodiment, a value in a test scenario template that is considered proprietary is removed from the template. Optionally, the proprietary data is removed by a data cleaner module, a template generator module, a customization module, and/or another module and/or combination of modules. In one example, a value may be deleted from a template; consequently, the template may contain an indication of missing data (corresponding to the deleted value); prior to running a test scenario based on the template and/or during the run of the test scenario, the missing data needs to be provided (e.g., the user is prompted to provide it). Alternatively, a value in a test scenario template that is considered proprietary may be removed from the template by replacing it with a default or "dummy" value.

In one embodiment, proprietary data is not included in a template. For example, a module generating a template and/or a module customizing a template, check whether certain values are proprietary (e.g., by checking whether a certain flag related to the certain values is raised, or by submitting the certain values to a procedure for evaluation). If the certain values are deemed to be proprietary, they are not included in the template.

Proprietary data may be removed from runs of test scenarios at different stages. In one embodiment, the proprietary data is removed from runs of test scenarios as the runs are recorded and/or identified. For example, a "scrubbed" version of runs, which does not contain certain proprietary data, may be the data that is provided to components of the system (e.g., a clustering module and/or template generator). Optionally, determining what proprietary data is may relate to general statistics (e.g., utilization of certain elements and/or values by a certain proportion of organizations).

In another embodiment, proprietary data is removed from runs after clustering of the runs is performed. Optionally, determining what data in the runs should be considered proprietary utilizes the fact that after clustering, clusters contain similar runs. In one example, the fact that runs belong to clusters may enable the identification of certain values that are shared by many runs (which may indicate that the certain values are not proprietary), or shared by a few runs (which may indicate that the certain values are proprietary).

In some embodiments, test scenario templates are generated from one or more runs of test scenarios belonging to a certain cluster. Optionally, the templates are generated in such a way that they are not likely to include data that may be easily traced to specific runs in the certain cluster, users that ran runs belonging to the certain cluster, and/or organizations associated with runs belonging to the certain cluster. In these embodiments, generating a template may involve selecting a value from a run of a test scenario belonging to the certain cluster, checking whether the value appears in at least a first predetermined number of the runs in the certain cluster; checking whether the value appears in runs in the certain cluster that are associated with at least a second predetermined number of different organizations; and if both conditions are positive, enabling the test scenario template to utilize the selected value. Optionally, if at least one of the conditions is negative the test scenario template is not allowed to utilize the selected value.

In one embodiment, removing proprietary data from a test scenario template generated from one or more runs of test scenarios involves removing most output fields from the runs. Consequently, most of the information generated in the runs may be removed. In one example, most of the information output in the runs is considered proprietary, and is therefore removed. Optionally, as a result of removing most of the output fields, the test scenario template does not include expected values for most test steps. Optionally, running an instantiation of the test scenario template may require a user to provide values in most of the test steps.

Customizing a Test Scenario Template

Test scenario templates generated from runs of test scenarios of users belonging to different organizations may not be ideal for a certain user from a certain organization. For example, the templates may include information such as values that do not suite the certain user and/or the certain organization, and/or include certain test steps that are irrelevant for the certain user and/or the certain organization. It therefore may be beneficial to customize test scenario templates for a certain user and/or a certain organization. Optionally, customizing a test scenario template may be done as part of generating the template (e.g., by the template generator), by another module such as a customization module, or a combination of modules.

In some embodiments, customizing a test scenario template involves adding to the test scenario template one or more values that are relevant to a certain user and/or a certain organization. Optionally, the one or more values that are added replace existing values in the template that may be less appropriate for the certain user and/or the certain organization. Optionally, at least some of the values added to the template by the customizing replace proprietary data that has been removed from the template (e.g., by a data cleaner module).

In some embodiments, customizing a test scenario template is done using proprietary data related to a certain user and/or a certain organization. The proprietary data may be directly related to the certain user and/or the certain organization, such as internal organizational data of the certain user and/or the certain organization, and/or data obtained by monitoring the certain user and/or users belonging to the certain organization. Additionally or alternatively, the proprietary data may be of a different user and/or different organization, and based on similarity to the certain user and/or certain organization the proprietary data is assumed to be useful for customizing the template.

Proprietary data used to customize a test scenario template may have various sources. In one embodiment, proprietary data relevant to a certain user, for whom a test scenario template is customized, is obtained by providing the test scenario template to a different user, prompting the different user to provide a missing value, and recording an input value provided by the different user. Alternatively, the same process may be performed with the certain user, i.e., the test scenario template is provided to the certain user, the certain user is prompted to provide a value, and the value provided by the certain user.

In another embodiment, the proprietary data relevant to the certain user for whom the test scenario template is customized is obtained by guiding a user to provide the proprietary data while semiautomatically executing an instantiation of the test scenario template. Optionally, the user providing the proprietary data is the certain user. Providing proprietary data via semiautomatic execution may involve filling a value into a field missing a value in an instantiation of the test scenario template. This may be done by selecting a value from a database related to the certain user and testing whether the selected value is congruous with the field. If the selected value is congruous with the field, filling the field with the selected value. Otherwise, prompting the first user to provide a value for the field missing a value. Optionally, selecting the value utilizes a heuristics-based algorithm that is run on data from multiple organizations. For example, the selection of the value may be based in part on determining how often the value is used by other organizations. Additionally or alternatively, providing proprietary data via semiautomatic execution may involve filling a value into a field missing a value in an instantiation of the test scenario template by identifying users similar to the certain user. Following that, selecting a value from runs of test scenarios of the users similar to the certain user and then testing whether the selected value is congruous with the field. If the selected value is congruous with the field, the field may be filled with the selected value. Otherwise, the certain user may be prompted to provide a value for the field missing a value.

In one embodiment, proprietary data relevant to a certain user, for whom a test scenario template is customized, is obtained by marking locations of values that were removed from the test scenario template, and directing attention of a user to provide data appropriate for the marked locations. Optionally, the user is the certain user for whom the template is customized. Optionally, the values removed from the test scenario template were removed by a data cleaner module.

One source of proprietary data useful for customizing a test scenario template for a certain user may be a profile of the certain user. For example, such a profile may be provided to a module that performs customization of the template. Data in the profile, such as proprietary information related to the user and/or the organization may be inserted into the template. For example, a profile of the certain user may include the user's name, address, job title, and/or employee number; these values may be inserted in their appropriate positions in a customized template in order to save the certain user the time and effort of inserting them when running an instantiation of the template. In another example, the profile of the certain user may include a list of customers the user works with, parts the user frequently orders, and/or contact information of clients the user frequently interacts with. These values may be automatically inserted into a template in order to customize it and make it more relevant to the certain user.

In one embodiment, a profile of a user that is used to customize a test scenario template is a profile of a generic user of an organization. In this case, customizing the template may utilize information that does not identify a specific user. For example, to customize a template the system may use activity data from the profile such as a list of modules that are frequently run, but not use data such as an employee name of a real employee.

Another source of proprietary data useful for customizing a test scenario template for a certain user may be a data generator related to the certain user and/or a certain organization to which the certain user belongs. For example, the data generator may be a program that extracts values from a database related to the certain organization. The database may hold "real world" information such as actual customer orders, which can be used to generate tests that are more relevant.

In one embodiment, customizing a test scenario template for a first user utilizes a customization module and involves obtaining proprietary data relevant to the first user and substituting a non-empty subset of proprietary data removed from the template with the obtained data. Optionally, the obtained data undergoes processing prior to being entered into the template.

In one example, the proprietary data relevant to the first user is obtained from a previously monitored run of test scenario associated with the first user; for instance, the run of the test scenario may have been run by the first user, run by a user associated to an organization to which the first user belongs, and/or a user with a similar organizational role as the first user (e.g., both users are sales managers).

In another example, the proprietary data relevant to the first user is obtained from parsing a manual test scenario associated with the first user in order to obtain a value associated with the first user. For example, the manual test scenario may be a script for running a test that is intended to be used by the first user, a user associated to an organization to which the first user belongs, and/or a user with a similar organizational role as the first user. After obtaining the value associated with the first user, a non-empty subset of the removed proprietary data from the template is substituted with the obtained value.

In yet another example, the proprietary data relevant to the first user is obtained from analyzing a database of the software system associated with the first user to obtain a value associated with the first user. The database may include data on and/or be accessed by the first user, a user associated to an organization to which the first user belongs, and/or a user with a similar organizational role as the first user. After obtaining the value associated with the first user, a non-empty subset of the removed proprietary data from the template is substituted with the obtained value.

In one embodiment, the customization module is also configured to: provide the customized test scenario template to a second user, prompt the second user to provide a missing value, and record an input value provided by the second user. Optionally, the first user and the second user are the same user.

Values used for customization of templates may be obtained, in some embodiments, by exploiting wisdom of the crowd. This "wisdom" may be gained by analyzing runs of users from different organization in order to find certain patterns and common values. In one example, many organizations have a dummy customer entry for testing; for example, a customer named "test". Thus, entering "test" as a user is likely to allow a test scenario to run, so a customization module may try using the customer "test" in a template being customized. In another example, SAP catalog numbers usually start from 1000, and 1000 usually describes a catalog number for tests and not a real number. Thus, when customizing a template, if a catalog number is needed, the value 1000 may be tried. In both of these examples, the knowledge of which default values may be gained by examining runs of users from different organizations. This allows a customization module to discover from the crowd certain values that may not be apparent to whomever is customizing the template.

In embodiments described in this disclosure, after generating a test scenario template from one or more runs of test scenarios (e.g., using a template generator), the template might undergo further processing such as removal of proprietary data, customization, ranking, and/or the template may be suggested to the user. Optionally, the one or more runs of test scenarios belong to a certain cluster of similar runs of test scenarios. FIG. 9A to FIG. 9G illustrate some, but not all, combinations of system modules that may be used in embodiments described in this disclosure to process the template and/or suggest the template to a user.

Figure 9A:
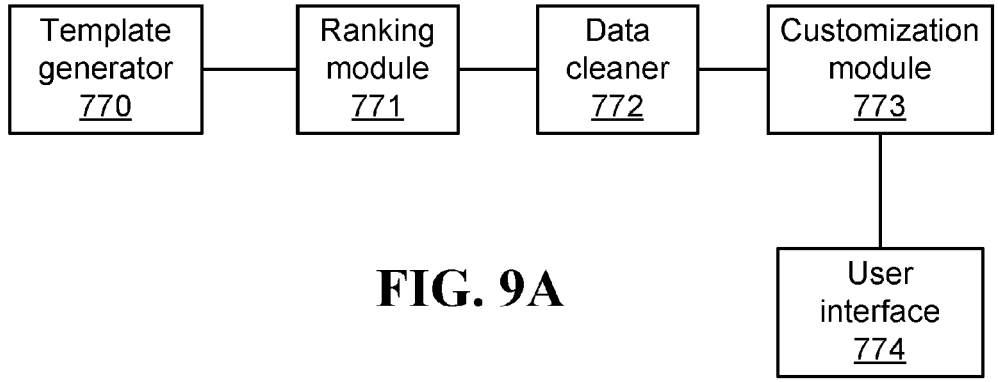
FIG. 9A illustrates a combination of system modules that may be used in embodiments described in this disclosure.

FIG. 9A illustrates a combination of system modules that may be used in embodiments in which a template generator 770 generates a test scenario template from one or more runs of test scenarios. The template is provided to a ranking module 771 that may rank the template, for example, by assigning it a score proportional to its relevancy to a certain user. Optionally, the ranking module 771 receives a profile of a certain user and/or a certain organization and utilizes data from the profile, in order to rank the template. Following that, a data cleaner 772 receives the template and may remove proprietary data from the template. Optionally, the data cleaner 772 receives a profile related to a certain user and/or a certain organization, and utilizes the profile to remove certain proprietary data from the template. After removing proprietary data from the template, the template from which proprietary was removed is provided to a customization module 773 that customizes the template by adding certain data to the template. Optionally, the customization module 773 receives a profile of a certain user and/or a certain organization and adds data from the profile, which relevant to the certain user and/or organization, to the template. The customized template from which proprietary data was removed is then provided to a user interface 774. Optionally, the user interface 774 presents to a user a suggestion to run an instantiation of the customized template from which proprietary data was first removed.

It is to be noted that in this disclosure, though modules may be illustrated in figures as separate elements, in some embodiments, they may be implemented as a single element that performs the functionality of modules. For example, the software module that implements the template generator 770 may also perform the tasks of the data cleaner 772. In another example, the customization module 773 and the data cleaner 772 are realized by the same software programs.

Figure 9B:
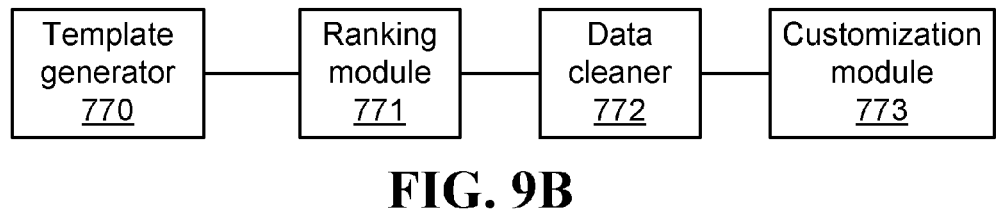
FIG. 9B illustrates a combination of system modules that may be used in embodiments described in this disclosure.

In other embodiments, after being processed by various modules, a template generated by the template generator need not be provided to a user interface. For example, it may be stored in the system for further use. FIG. 9B illustrates a similar portion of a system to the system illustrated in FIG. 9A, however in this system after being subjected to ranking, removal of proprietary data, and customization, a template is not presented to a user via a user interface.

Figure 9C:
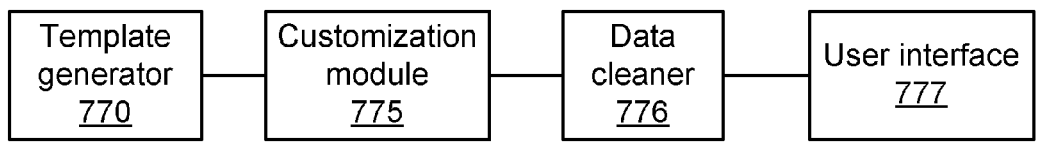
FIG. 9C illustrates a combination of system modules that may be used in embodiments described in this disclosure.
Figure 9D:
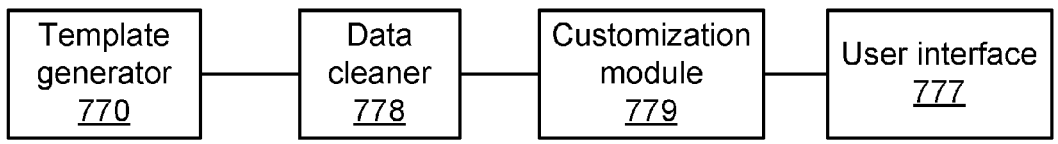
FIG. 9D illustrates a combination of system modules that may be used in embodiments described in this disclosure.

The order in which a template may undergo processing by system modules may differ between embodiments. For example, FIG. 9C illustrates a combination of system modules which includes the template generator 770 which provides a template for customization by a customization module 775. Following the customization, a data cleaner 776 removes proprietary data from the template. The template is then provided to a user interface 777, for example, in order to be suggested to a user. FIG. 9D illustrates a similar system, however in it a template generated by the template generator 770 is first provided to a data cleaner 778. After removing proprietary data from the template, the template is provided to a customization module 779. The customized template may then be presented to a user via the user interface 777.

Figure 9E:
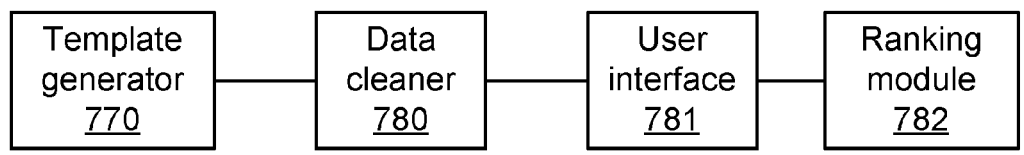
FIG. 9E illustrates a combination of system modules that may be used in embodiments described in this disclosure.
Figure 9F:
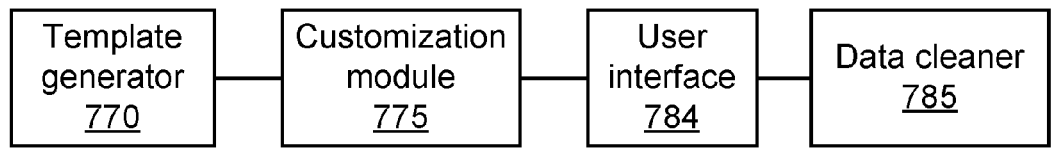
FIG. 9F illustrates a combination of system modules that may be used in embodiments described in this disclosure.

In some embodiments, a user interface is not necessarily used to suggest templates to a user; it may be utilized by other system modules to perform their task. FIG. 9E illustrates a combination of system modules that may be utilized in embodiments, in which a ranking module 782 and a data cleaner 780 interact with a user interface 781. For example, the data cleaner 780 may present a template generated by the template generator 770 to a user on the user interface 781, in order for the user to mark and/or approve certain proprietary data the data cleaner found in the template. Additionally, the ranking module 782 may present a ranking of the template in order for the user to verify the ranking and/or edit it. Optionally, the user may then determine what is to be done with the template (e.g., should the user run it, save it for later, and/or discard it). FIG. 9F illustrates a combination of system modules that may be utilized in embodiments, in which a customization module 775 utilizes a user interface to perform customization of a template. For example, data that was added to a template generated by the template generator 770 is presented to a user on a user interface 784 for approval and/or editing. Following that, the template may be subjected to removal of proprietary data by a data cleaner 785. For example, the proprietary data may be added by the user via the user interface 784.

Figure 9G:
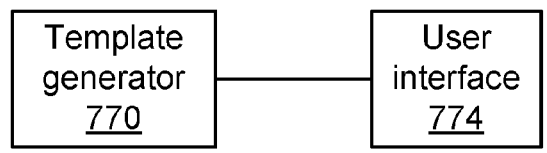
FIG. 9G illustrates a combination of system modules that may be used in embodiments described in this disclosure.

In some embodiments, a template that is generated by a template generator does not undergo additional processing by system modules. For example, as illustrated in FIG. 9G, after being generated by the template generator 770, the template may be sent to the user interface 774 (e.g., to be suggested to a user).

While some of the above embodiments may be described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, such as: cloud computing, a client-server model, grid computing, peer-to-peer, hand-held devices, multiprocessor systems, microprocessor-based systems, programmable consumer electronics, minicomputers, and/or mainframe computers. The embodiments may also be practiced in a distributed computing environment where tasks are performed by remote processing devices that are linked through a communication network. In a distributed computing environment, program components may be located in both local and remote computing and/or storage devices. Some of the embodiments may also be practiced in the form of a service, such as infrastructure as a service (IaaS), platform as a service (PaaS), software as a service (SaaS), and/or network as a service (NaaS).

Embodiments may be implemented as a computer implemented method, a computer system, and/or as a non-transitory computer-readable medium. The non-transitory computer-readable medium comprises program code which provides, or participates in providing, instructions to a processor. The non-transitory computer-readable medium may be implemented, for example, via one or more of a volatile computer memory, a non-volatile memory, a hard drive, a flash drive, a magnetic data storage, an optical data storage, and/or any other type of a tangible computer memory to be invented that is not transitory signals per se. The program code may be updated and/or downloaded to the non-transitory computer-readable medium via a communication network such as the Internet.

Herein, a predetermined value, such as a predetermined threshold, may be a fixed value and/or a value determined any time before performing a calculation that compares a certain value with the predetermined value. A value may also be considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A computer system configured to rate popularity of clusters of runs of test scenarios, comprising: processor and memory;
   an interface configured to receive runs of test scenarios run by users belonging to different organizations essentially on same packages of software systems;
   a clustering module configured to cluster the runs into clusters comprising similar runs of test scenarios;
   an organization counter configured to count a number of different organizations associated with a cluster; wherein a cluster, with which an organization is associated, comprises a run of a test scenario run by a user belonging to the organization; and
   a cluster rating module configured to compute popularity ratings of at least some of the clusters based on the number of different organizations associated with the clusters; wherein the higher the number of different organization associated with a cluster, the higher the popularity rating of the cluster wherein each organization of the different organizations has a different composition of shareholders.

2. The computer system of claim 1, wherein the cluster rating module is further configured to count number of common input fields in a cluster; wherein a common input field in a cluster is an input field used by at least a predetermined percentage of the runs in the cluster; the cluster rating module is further configured to adjust the popularity rating of the cluster to reflect the number of common input fields in the cluster; wherein the more common input fields in runs belonging to a cluster, the higher the popularity rating of the cluster.

3. The computer system of claim 1, further comprising a template generator configured to generate a test scenario template based on at least one run of a test scenario from a cluster with a high popularity rating; wherein the test scenario template identifies a transaction used by the at least one run of a test scenario belonging to the cluster with the high popularity rating, and possible values for running the transaction.

4. The computer system of claim 3, wherein the template generator is further configured to generate the test scenario template based on at least two runs of test scenarios belonging to the cluster with the high popularity rating; and wherein the at least two runs were run by users associated with different organizations.

5. The computer system of claim 3, further comprising a data cleaner configured to: select a value from the test scenario template; determine that at least one of the following is true: the selected value appears in less than a first predetermined number of runs belonging to the cluster with the high popularity rating, and runs belonging to the cluster with the high popularity rating that include the selected value are associated with less than a second predetermined number of different organizations; and remove the selected value from the test scenario template; wherein both the first predetermined number and the second predetermined number are greater than one.

6. The computer system of claim 3, further comprising a data cleaner configured to: select a value from a run of a test scenario in the cluster with the high popularity rating, determine that the value appears in at least a first predetermined number of runs of test scenarios in the cluster with the high popularity rating, determine that the value appears in runs in the cluster with the high popularity rating that are associated with at least a second predetermined number of different organizations, and enable the test scenario template to utilize the selected value.

7. The computer system of claim 6, wherein the data cleaner is further configured to: determine that at least one of the following is not true: the value appears in at least the first predetermined number of runs of test scenarios in the cluster with the high popularity rating, and the value appears in runs in the cluster with the high popularity rating that are associated with at least the second predetermined number of different organizations; and not to enable the test scenario template to utilize the selected value.

8. The computer system of claim 3, further comprising a user interface configured to suggest to a user to run an instantiation of the test scenario template.

9. The computer system of claim 1, wherein the clustering module is configured to process one or more of the following logged activities: list of users who ran the test scenarios, analysis of access to a database, messages returned from executed transactions, values returned by fields, and procedures utilized by a test scenario.

10. The computer system of claim 1, wherein similar runs of test scenarios are characterized by having at least one of: essentially same fields, essentially same field values, similar combinations of fields, similar combinations of field values, similar execution of transactions, similar user interactions, similar requests, similar calls to procedures, and similar executions.

11. A computer implemented method for rating popularity of clusters of runs of test scenarios, comprising:
receiving runs of test scenarios run by users from different organizations essentially on same packages of software systems;
clustering the runs into clusters comprising similar runs of test scenarios;
counting number of different organizations associated with the clusters; wherein a cluster, with which an organization is associated, comprises a run of a test scenario run by a user belonging to the organization; and
computing popularity ratings of at least some of the clusters based on number of different organizations associated with each of the clusters; wherein the higher the number of different organizations associated with a cluster, the higher the popularity rating of the cluster wherein each organization of the different organizations has a different composition of shareholders.

12. The computer implemented method of claim 11, further comprising monitoring the users running the test scenarios on the software systems that belong to the different organizations in order to identify the runs of the test scenarios.

13. The computer implemented method of claim 11, further comprising counting number of common input fields in clusters; wherein a common input field in a cluster is an input field used by at least a predetermined percentage of the runs in the cluster; and further comprising adjusting the popularity rating of a cluster to reflect the number of common input fields in the cluster; wherein the more common input fields in runs in a cluster, the higher the popularity rating of the cluster.

14. The computer implemented method of claim 11, further comprising generating a test scenario template based on at least one run of a test scenario from a cluster with a high popularity rating; wherein the test scenario template identifies a transaction used by the at least one run of a test scenario belonging to the cluster with the high popularity rating, and possible values for running the transaction.

15. The computer implemented method of claim 14, wherein the generating of the test scenario template is based on at least two runs of test scenarios belonging to the cluster with the high popularity rating; and wherein the at least two runs were run by users associated with different organizations.

16. The computer implemented method of claim 11, wherein the clustering is based on one or more of the following logged activities: list of users who ran the test scenarios, analysis of access to a database, messages returned from executed transactions, values returned by fields, and procedures utilized by a test scenario.

17. A non-transitory computer-readable medium for use in a computer to rate popularity of clusters of runs of test scenarios, the computer comprises a processor, and the non-transitory computer-readable medium comprising:
program code for receiving runs of test scenarios run by users from different organizations essentially on same packages of software systems;
program code for clustering the runs into clusters comprising similar runs of test scenarios;
program code for counting number of different organizations associated with the clusters; wherein a cluster, with which an organization is associated, comprises a run of a test scenario run by a user belonging to the organization; and
program code for rating popularity of the clusters based on number of different organizations associated with each of the clusters; wherein the higher the number of different organizations associated with a cluster, the higher the popularity rating of the cluster wherein each organization of the different organizations has a different composition of shareholders.

18. The non-transitory computer-readable medium of claim 17, further comprising program code for monitoring the users running the test scenarios on the software systems that belong to the different organizations in order to identify the runs of the test scenarios.

19. The non-transitory computer-readable medium of claim 17, further comprising program code for generating a test scenario template based on at least one run of a test scenario from a cluster with a high popularity rating; wherein the test scenario template identifies a transaction used by the at least one run of a test scenario belonging to the cluster with the high popularity rating, and possible values for running the transaction.

20. The non-transitory computer-readable medium of claim 19, further comprising program code for generating of the test scenario template based on at least two runs of test scenarios belonging to the cluster with the high popularity rating; and wherein the at least two runs were run by users associated with different organizations.

* * * * *